(12) United States Patent
Weng

(10) Patent No.: US 12,409,904 B2
(45) Date of Patent: Sep. 9, 2025

(54) ELECTRONIC CONTROL LOCK IN COMBINATION WITH KICKSTAND OF A BICYCLE

(71) Applicant: SINOX CO., LTD, New Taipei (TW)

(72) Inventor: Chia-Wei Weng, Taipei (TW)

(73) Assignee: SINOX CO., LTD, New Taipei (TW)

( * ) Notice: Subject to any disclaimer, the term of this patent is extended or adjusted under 35 U.S.C. 154(b) by 382 days.

(21) Appl. No.: 17/874,430

(22) Filed: Jul. 27, 2022

(65) Prior Publication Data

US 2023/0040948 A1 Feb. 9, 2023

Related U.S. Application Data

(60) Provisional application No. 63/229,123, filed on Aug. 4, 2021.

(30) Foreign Application Priority Data

Apr. 20, 2022 (TW) .................................. 111115080

(51) Int. Cl.
    *B62H 5/00* (2006.01)
    *E05B 71/00* (2006.01)
(52) U.S. Cl.
    CPC ............. *B62H 5/005* (2013.01); *E05B 71/00* (2013.01)
(58) Field of Classification Search
    CPC . B62H 1/02; B62H 1/04; B62H 5/005; B62H 2700/005; E05B 71/00
    USPC ................................................ 280/298, 301
    See application file for complete search history.

(56) References Cited

U.S. PATENT DOCUMENTS

| | | | | |
|---|---|---|---|---|
| 4,298,211 A | * | 11/1981 | Shitamori | B62H 5/005 280/297 |
| 5,029,667 A | * | 7/1991 | Fujita | B62H 1/04 180/219 |
| 6,170,846 B1 | * | 1/2001 | Holter | B62H 1/02 280/297 |
| 6,536,792 B2 | * | 3/2003 | Strasser | B62H 1/02 280/293 |
| 10,093,379 B2 | | 10/2018 | Hines et al. | |

FOREIGN PATENT DOCUMENTS

| | | |
|---|---|---|
| CN | 102795278 A * | 11/2012 |
| CN | 102837768 A | 12/2012 |
| CN | 202970200 U | 6/2013 |

(Continued)

*Primary Examiner* — Alyson M Merlino
(74) *Attorney, Agent, or Firm* — Best & Flanagan LLP

(57) ABSTRACT

An electronic control lock of a bicycle has an electronic controller, a kickstand lock, and a frame lock. The kickstand lock includes a kickstand and a stand control device. When locking, the stand control device stops the kickstand from being kicked up, causing inconvenience or impossible to ride the bicycle. The frame lock includes an inserting element and a frame control device. When locking, the frame control device makes the inserting element unable to be pulled out. Thus the inserting element can fasten the bicycle with a chain. When unlocking, the stand control device and the frame control device are controlled by the electronic controller, which is controlled by a user, to allow the kickstand being kicked up and the inserting element being pulled out. The kickstand lock and the frame lock can be locked or unlocked without traditional keys.

1 Claim, 22 Drawing Sheets

(56) References Cited

FOREIGN PATENT DOCUMENTS

| CN | 107264678 | A | | 10/2017 | |
|---|---|---|---|---|---|
| CN | 108909885 | A | * | 11/2018 | ............... B62H 1/02 |
| CN | 108909885 | B | | 3/2020 | |
| DE | 3715882 | A | * | 11/1988 | ............. B62H 5/005 |
| FR | 2554072 | A | * | 5/1985 | ............. B62H 5/005 |
| JP | 02063984 | A | * | 3/1990 | |
| JP | 02081774 | A | * | 3/1990 | |
| JP | 02169377 | A | * | 6/1990 | |
| JP | 09207846 | A | * | 8/1997 | |

\* cited by examiner

ELECTRONIC CONTROL LOCK IN COMBINATION WITH KICKSTAND OF A BICYCLE

BACKGROUND OF THE INVENTION

1. Field of the Invention

The present invention relates to a lock of a bicycle, especially to a frame lock and a kickstand lock that can be electronically controlled, and a locking/unlocking method of the frame lock and the kickstand lock.

2. Description of the Prior Art(s)

In modern society, in order to prevent a bicycle from being stolen, users often buy locks to lock the bicycle at a specification position or to prevent the wheels of the bicycle from turning. However, a conventional lock for the bicycles is locked or unlocked by inserting a key, which is inconvenient to use. Therefore, the conventional lock for the bicycles needs to be improved.

To overcome the shortcomings, the present invention provides an electronic control lock of a bicycle and an electronically controlled locking/unlocking method of a bicycle to mitigate or obviate the aforementioned problems.

SUMMARY OF THE INVENTION

The main objective of the present invention is to provide an electronic control lock of a bicycle. The electronic control lock comprises an electronic controller and a kickstand lock. The kickstand lock includes a kickstand and a stand control device. The kickstand is rotatable and has a flip-down state and a kicked-up state. The stand control device is in signal connection with the electronic controller, is controlled by the electronic controller, and has a stand locking state and a stand unlocking state. In the stand locking state, the stand control device stops the kickstand that is in the flip-down state from being rotated to the kicked-up state. In the stand unlocking state, the kickstand is rotatable to the flip-down state and the kicked-up state.

The main objective of the present invention is to provide an electronic control lock of a bicycle. The electronic control lock comprises an electronic controller and a frame lock. The frame lock includes a housing, an inserting element, and a frame control device. The housing has an insertion hole. The inserting element is detachably inserted in the insertion hole. The frame control device is in signal connection with the electronic controller, is controlled by the electronic controller, and has a frame locking state and a frame unlocking state. In the frame locking state, the frame control device stops the inserting element from detaching from the insertion hole. In the frame unlocking state, the inserting element is detachable from the insertion hole.

The main objective of the present invention is to provide an electronically controlled locking/unlocking method of a bicycle. When a kickstand has been flipped down, a stand control device makes the kickstand unable to be kicked up. When unlocking the kickstand, the stand control device is controlled by sending signals through an electronic controller, thereby the kickstand is able to be kicked up.

The main objective of the present invention is to provide an electronically controlled locking/unlocking method of a bicycle. When an inserting element has been inserted into an insertion hole, a frame control device makes the inserting element unable to detach from the insertion hole. When unlocking the inserting element, the frame control device is controlled by sending signals through an electronic controller, thereby the inserting element is detachable from the insertion hole.

In the present invention, the stand control device controls rotation of the kickstand, and the frame control device controls whether the inserting element can be pulled out. When the kickstand is locked, the stand control device stops the kickstand that is in the flip-down state from being kicked up. Thus, the kickstand keeps flipping down, which causes inconvenience to ride the bicycle or even stops a pedal from rotating. When the frame lock is locked, the frame control device stops the inserting element from being pulled out of the insertion hole. The inserting element can be connected with a chain, so as to fasten the bicycle to a specific place. Besides, the chain may be mounted through a wheel of the bicycle, so as to prevent the wheel from rotating.

When unlocking, a user may control the electronic controller in various ways, such as through an application in a mobile phone. The stand control device is controlled by the electronic controller to allow the kickstand being kicked up, making it easy to ride the bicycle. The frame control device is controlled by the electronic controller to allow the inserting element being pulled out or be ejected automatically. Therefore, the kickstand lock and the frame lock can be unlocked without traditional keys.

In addition, since the kickstand is controlled by the stand control device and the inserting element is controlled by the frame control device, the kickstand and the inserting element may be designed with automatic locking function. For instance, when the kickstand is kicked to flip down, the stand rotating device is automatically switched to a locking state, or when the inserting element has been inserted into the insertion hole, the frame control device is automatically switched to a locking state. Thus, the kickstand lock and the frame lock can be locked without traditional keys.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
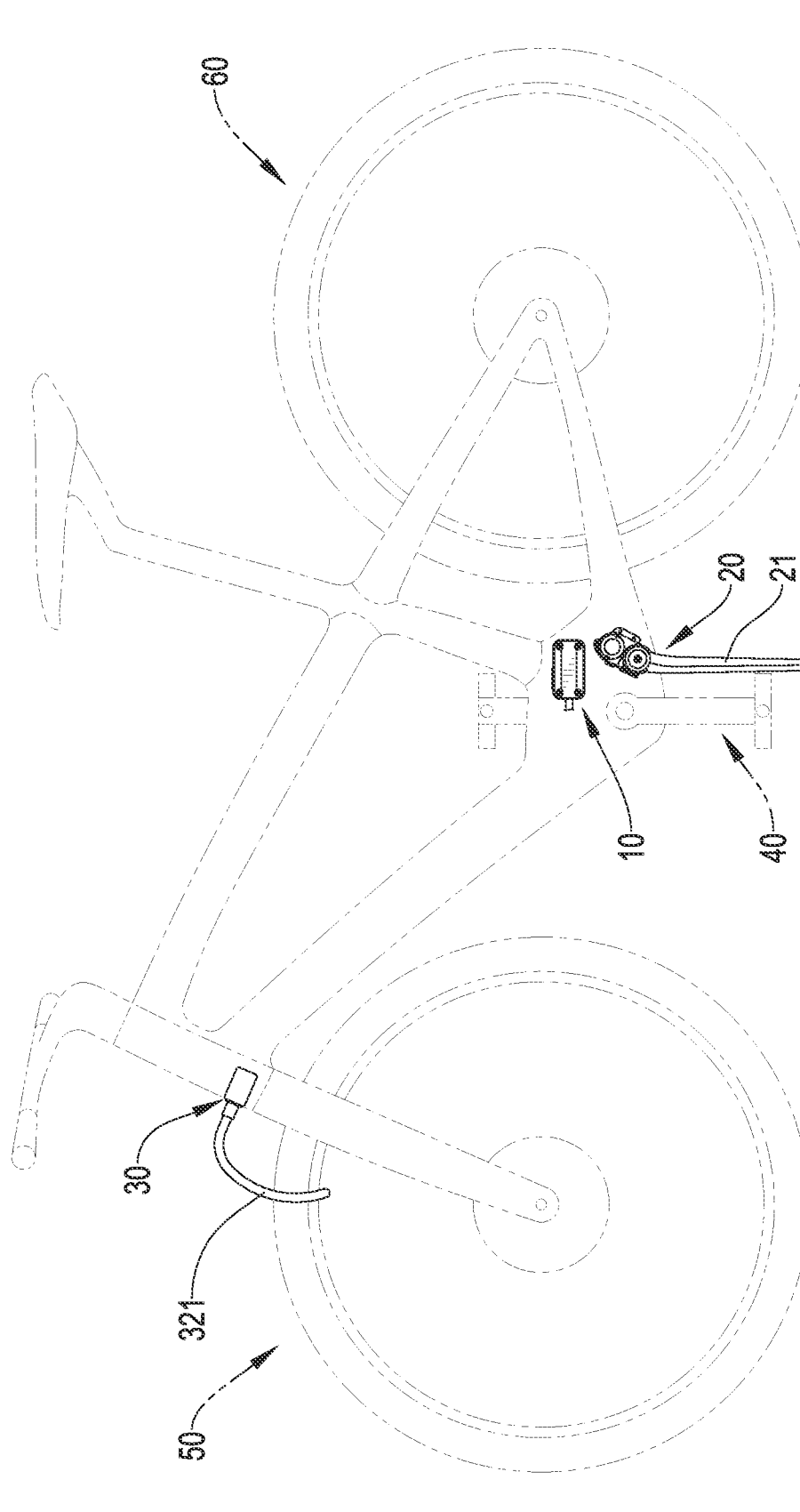
FIGS. 1 and 2 are operational side views of a first embodiment of an electronic control lock in accordance with the present invention, showing mounted on a bicycle.
Figure 2:
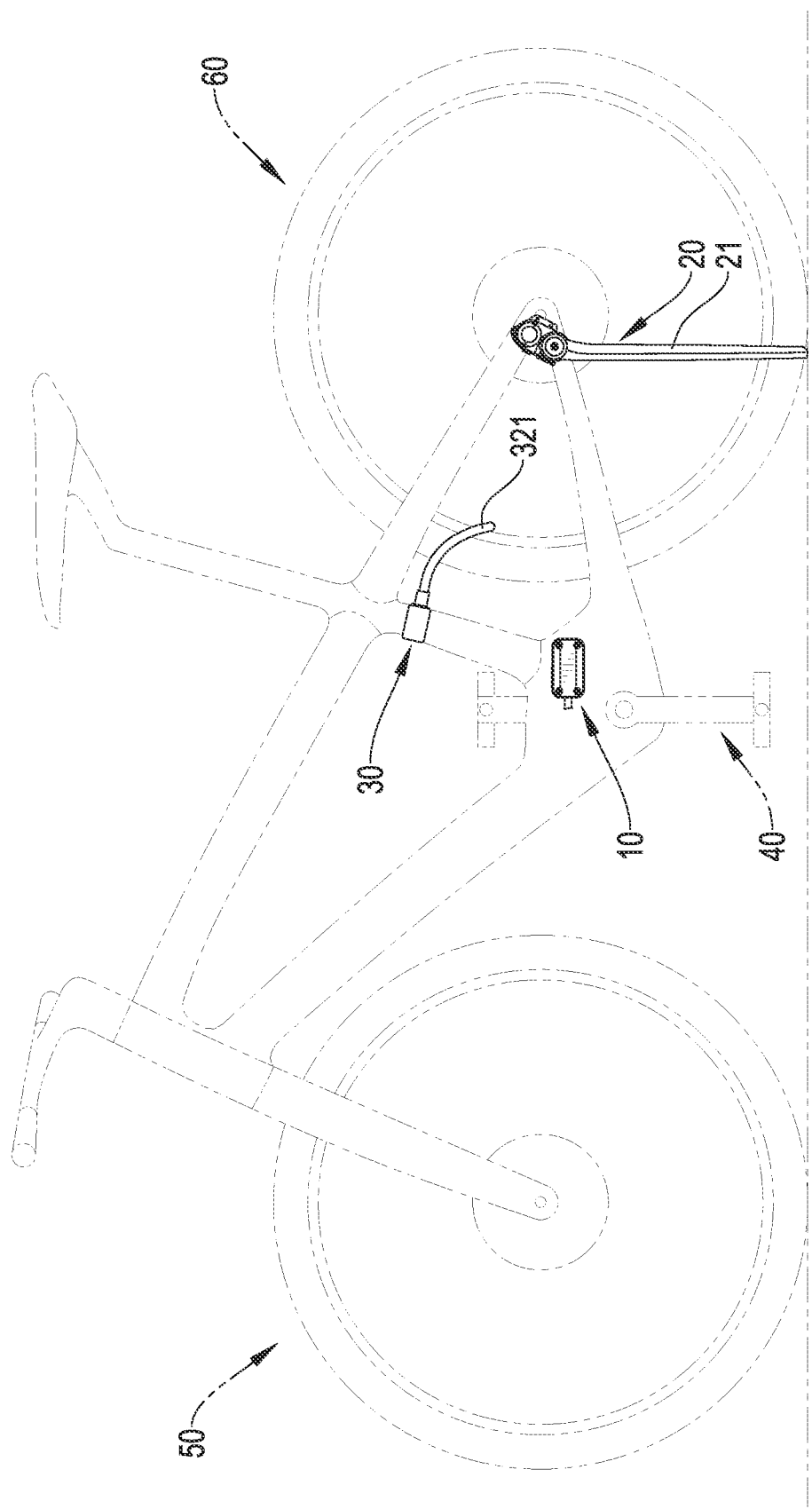

With reference to FIGS. 1 and 2, a first embodiment of an electronic control lock of a bicycle in accordance with the present invention comprises, but not limited to, an electronic controller 10, a kickstand lock 20, and a frame lock 30. In other embodiments, the electronic control lock of the bicycle may only comprise the electronic controller 10 and the kickstand lock 20, or only comprise the electronic controller 10 and the frame lock 30.

Figure 3:
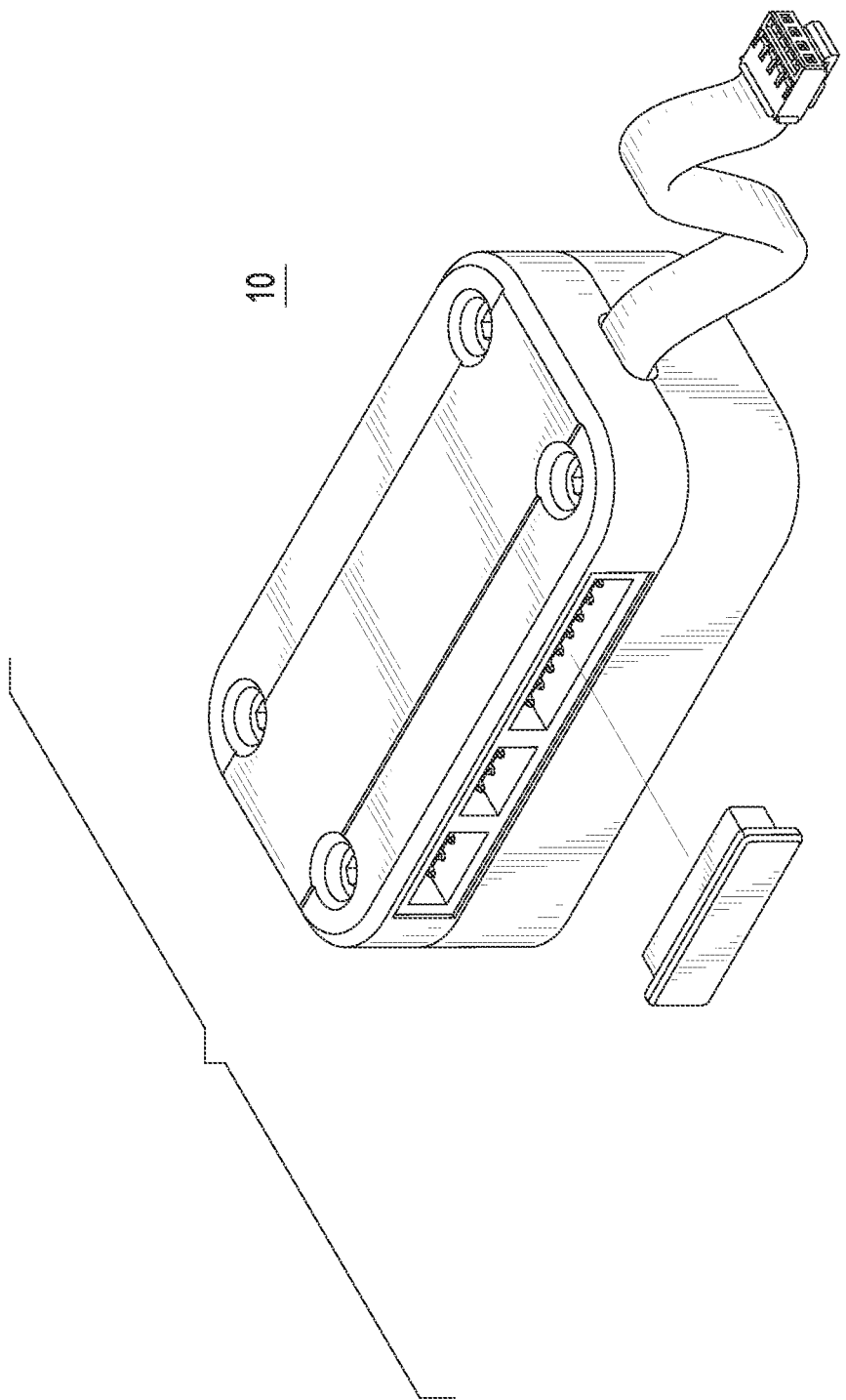
FIG. 3 is an exploded perspective view of an electronic controller of the first embodiment of the electronic control lock in FIG. 1.

With reference to FIGS. 1 to 3, the electronic controller 10 may be mounted anywhere on the bicycle, as long as the electronic controller 10 is able to be electrically connected to the kickstand lock 20 and the frame lock 30. In addition, the electronic controller 10 may be electrically connected to the kickstand lock 20 and the frame lock 30 in a wired or wireless manner. Preferably, the electronic controller 10 has a Controller Area Network Bus (CAN bus) system and a Bluetooth Low Energy (BLE) system and may also be equipped with a Global Positioning System (GPS).

With reference to FIGS. 1 and 2, the kickstand lock 20 may also be mounted anywhere on the bicycle, as long as a kickstand 21 can be propped on the ground when being flipped down. Preferably, as shown in FIG. 1, the kickstand lock 20 may be mounted beside a pedal 40, so as to prevent the pedal 40 from turning. Besides, as shown in FIG. 2, the kickstand lock 20 may be mounted to an axle of a rear wheel 60, which is a common position for mounting the kickstand 21.

With reference to FIGS. 1 and 2, the frame lock 30 may also be mounted anywhere on the bicycle. Preferably, as shown in FIG. 1, the frame lock 30 may be mounted beside a front wheel 50 or the rear wheel 60, so as to directly lock the front wheel 50 or the rear wheel 60 (such as with a chain 321). However, it is not limited thereto, and the frame lock 30 may also be fastened to a parking rack. In this way, the frame lock 30 does not have to be disposed adjacent to the front wheel 50 or the rear wheel 60.

Figure 4:
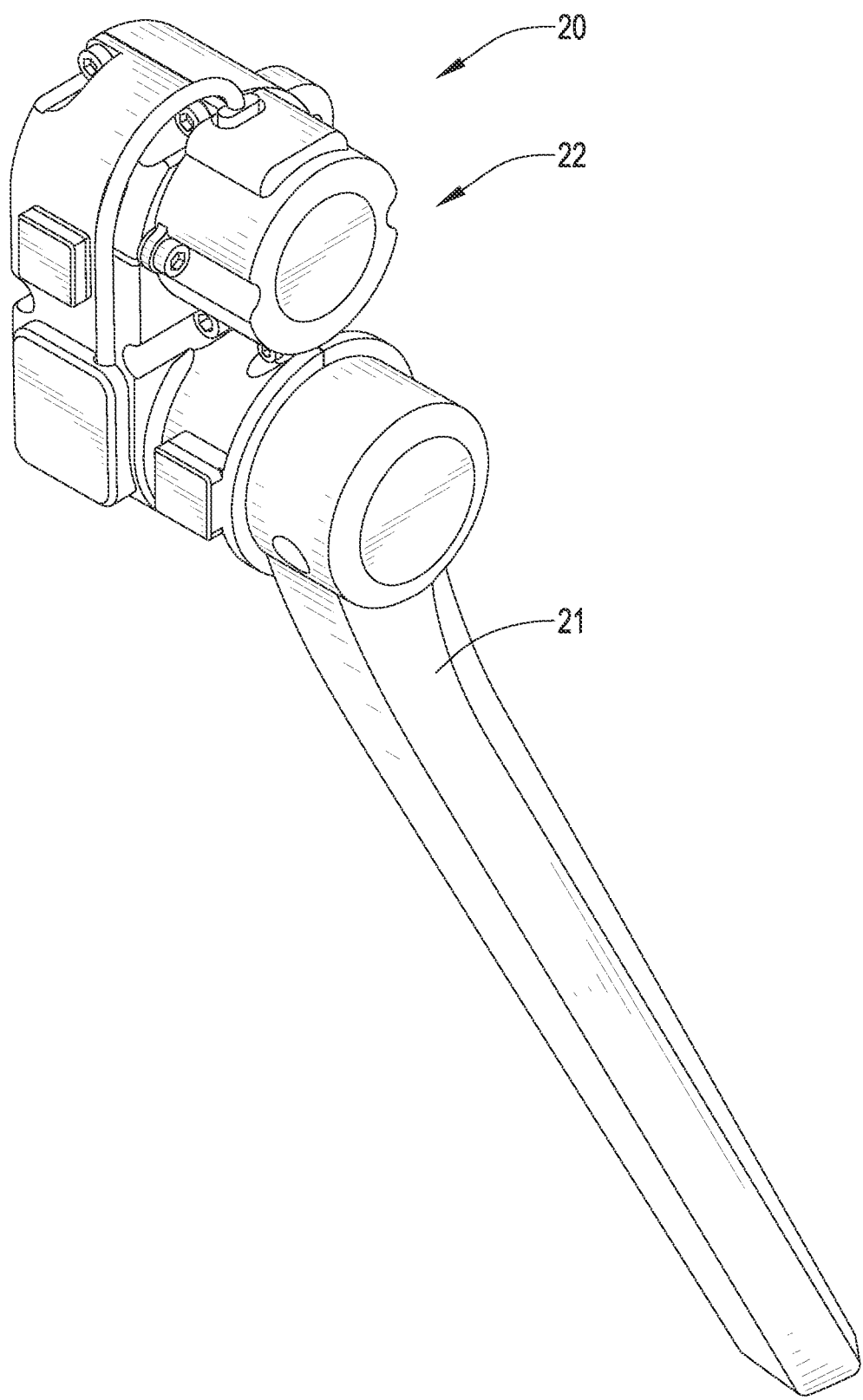
FIG. 4 is a perspective view of a kickstand lock of the first embodiment of the electronic control lock in FIG. 1.

With reference to FIG. 4, the kickstand lock 20 includes a kickstand 21 and a stand control device 22.

With reference to FIGS. 1 and 4, the kickstand 21 is rotatable and has a flip-down state and a kicked-up state. When the kickstand lock 20 is mounted beside the pedal 40, it is the kickstand 21 that is disposed beside the pedal 40. As the kickstand 21 is in the flip-down state, the kickstand 21 prevents the pedal of the bicycle from turning, so as to provide anti-theft effect. As for the kickstand 21 that prevents the pedal 40 from turning, it is not limited to make the pedal 40 be stuck by the kickstand 21 completely and may be just prevent the pedal 40 from turning (interfere with the turning of the pedal 40).

The stand control device 22 is in signal connection with the electronic controller 10 (wired or wireless), is controlled by the electronic controller 10, and has a stand locking state and a stand unlocking state. In the stand locking state, the stand control device 22 stops the kickstand 21 that is in the flip-down state from being rotated to the kicked-up state. In the stand unlocking state, the kickstand 21 is rotatable to the flip-down state and the kicked-up state.

Figure 5:
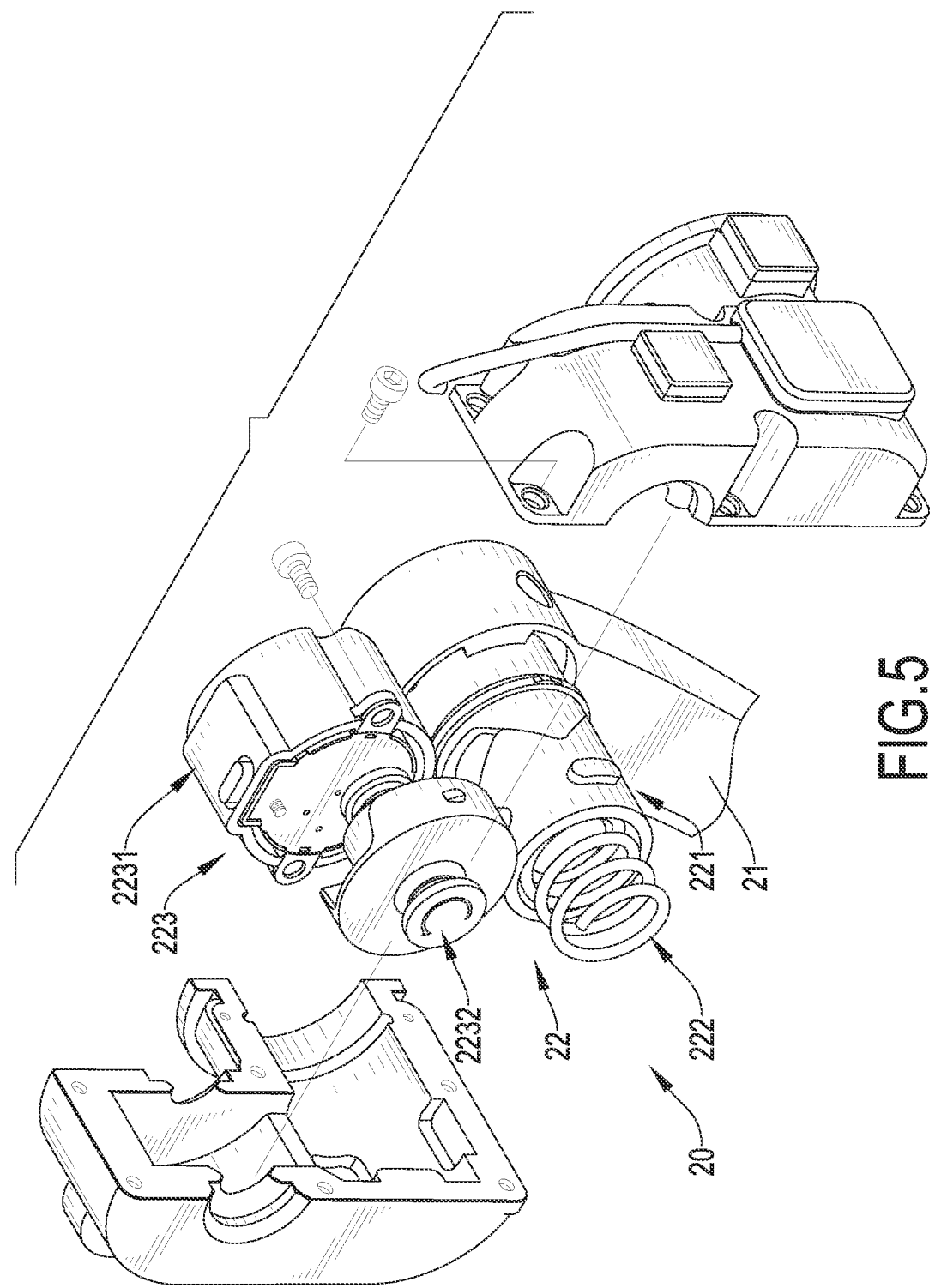
FIGS. 5 and 6 are exploded perspective views of the kickstand lock of the first embodiment of the electronic control lock in FIG. 4.
Figure 6:
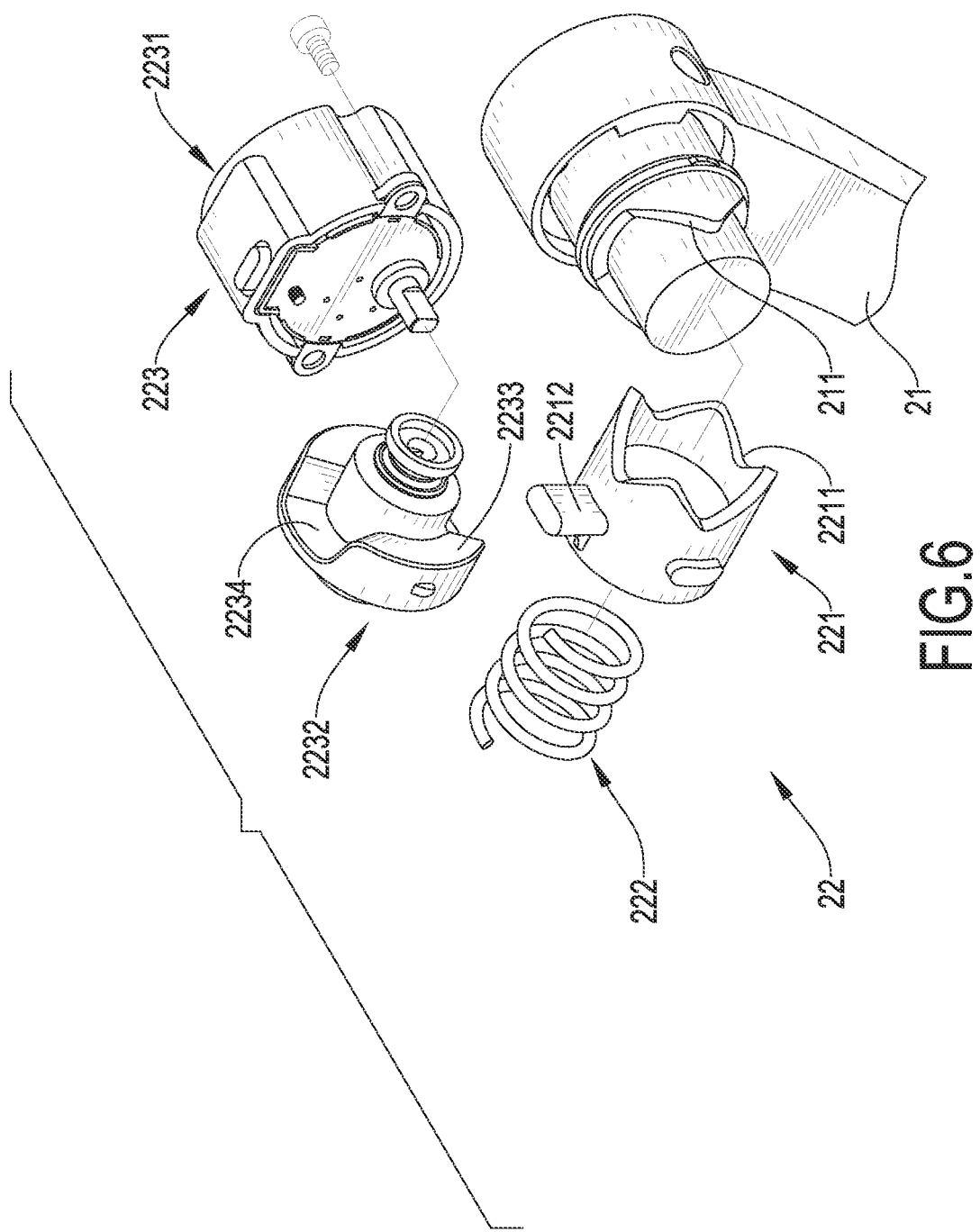
Figure 7:
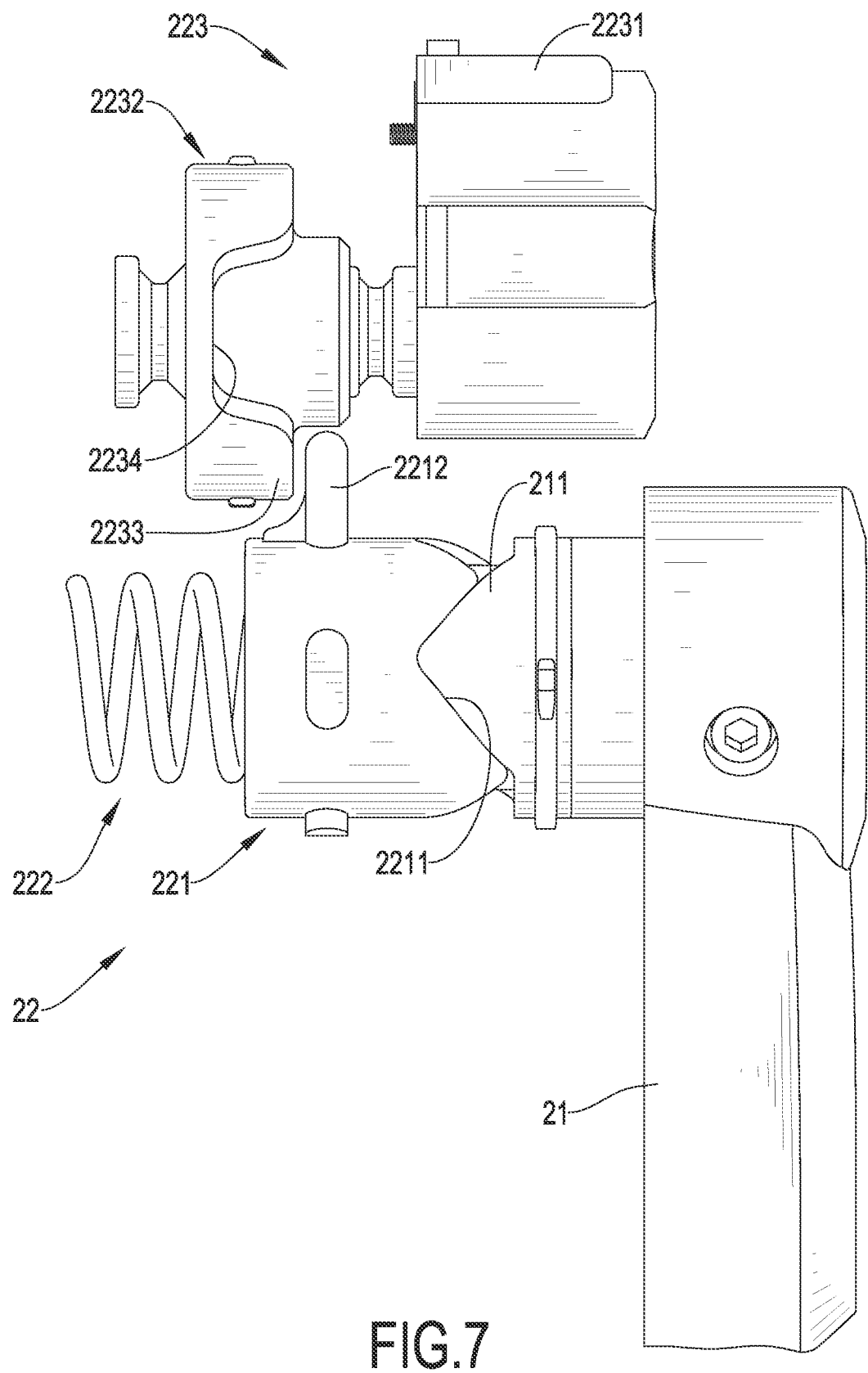
FIGS. 7 to 10 are operational side views of the kickstand lock of the first embodiment of the electronic control lock in FIG. 4.
Figure 8:
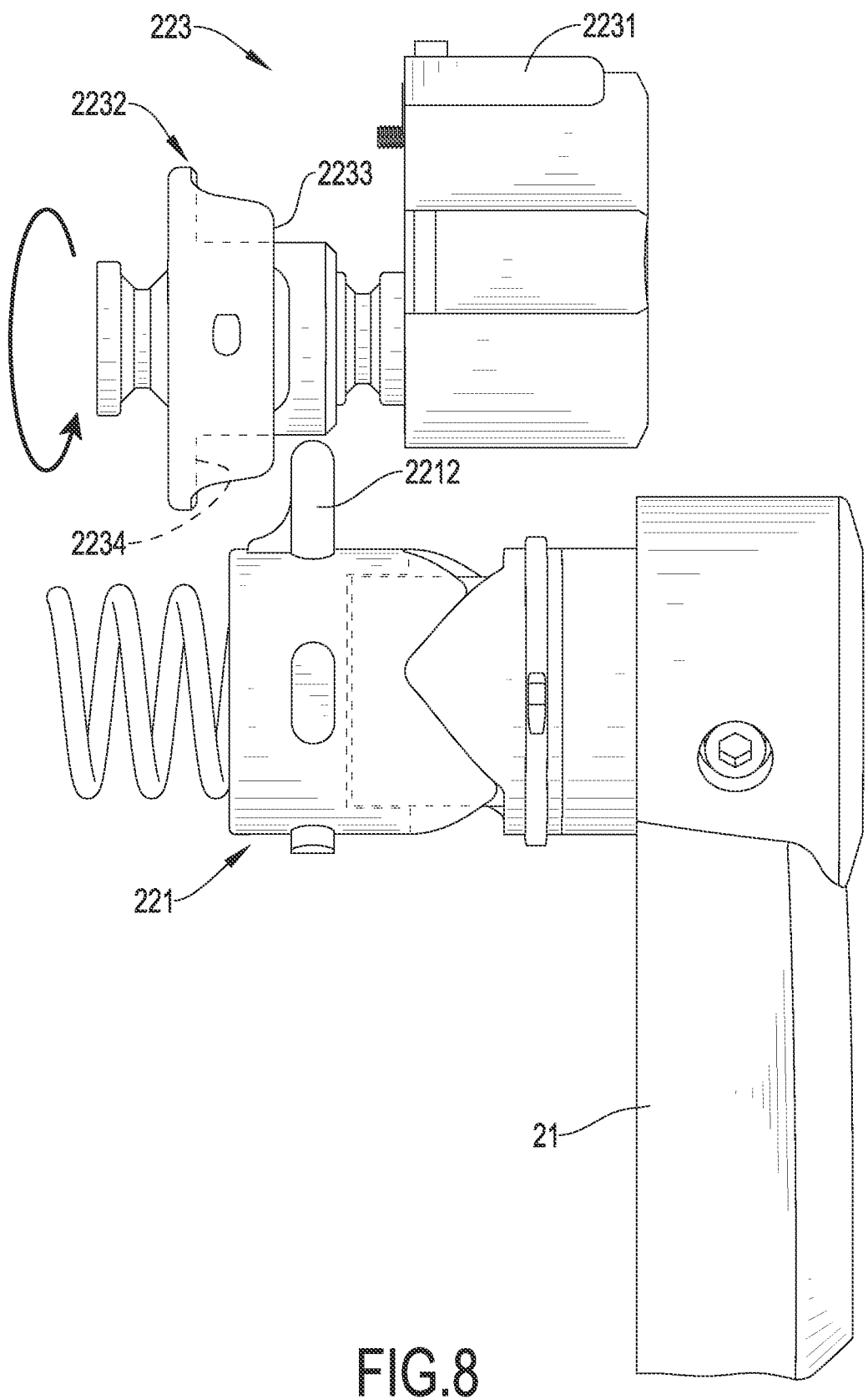
Figure 9:
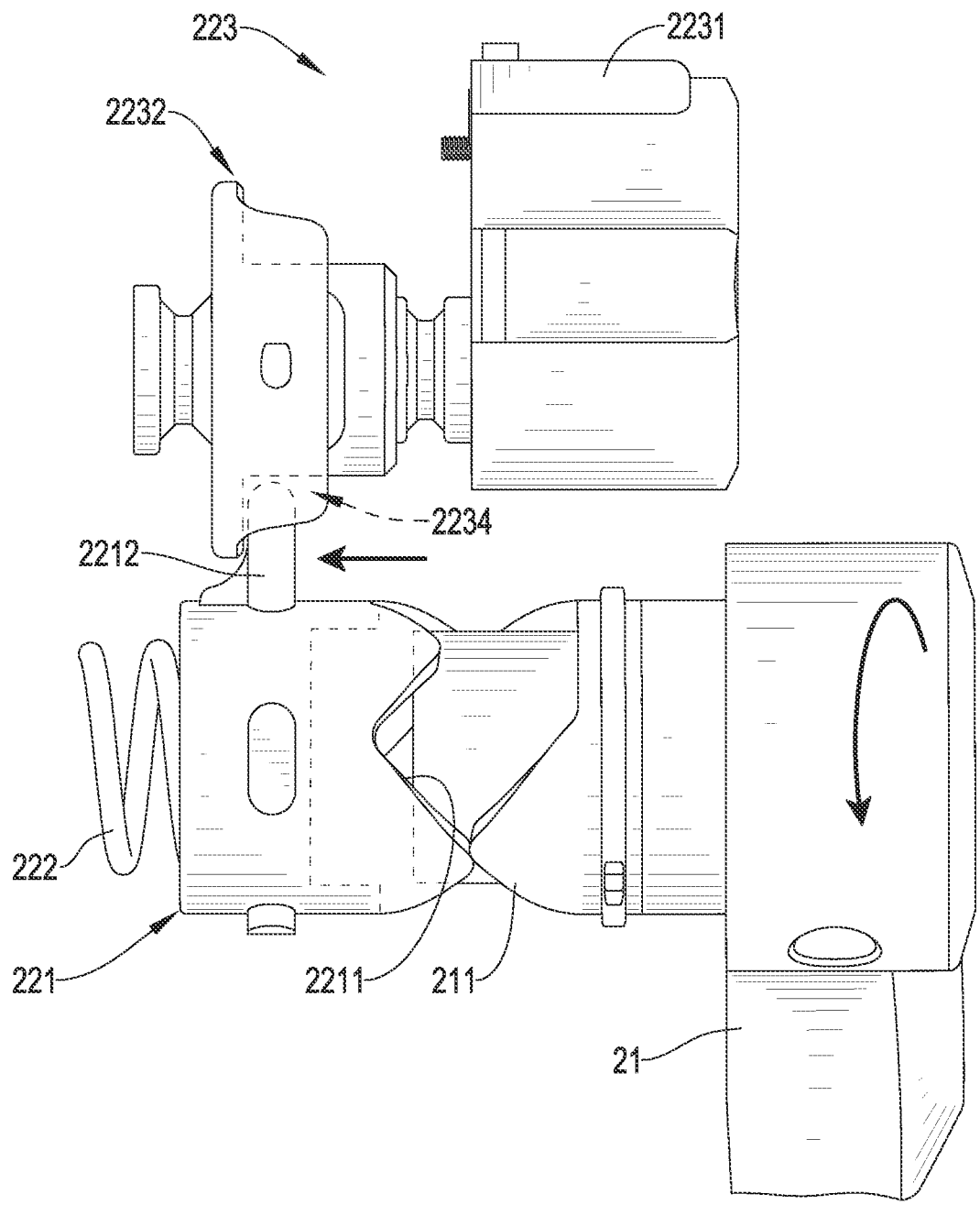

With reference to FIGS. 5 to 7, a structure, which stops the kickstand 21 from being kicked up, of the stand control device 22 is shown. Preferably, the stand control device 22 includes a stand engaging element 221, a stand resilient element 222, and a stand operating element 223. The stand resilient element 222 tends to force the stand engaging element 221 to engage with the kickstand 21, so as to stop the kickstand 21 from rotating. The stand resilient element 222 is preferably a compression spring. The stand operating element 223 is in signal connection with the electronic controller 10 and is controlled by the electronic controller 10. With reference to FIG. 7, in the stand locking state, the stand operating element 223 stops the stand engaging element 221 from disengaging with the kickstand 21. With reference to FIGS. 8 and 9, in the stand unlocking state, the stand operating element 223 allows the stand engaging element 221 to disengage with the kickstand 21.

With reference to FIGS. 6, 7 and 9, an engaging structure between the stand engaging element 221 and the kickstand 21 is shown. Preferably, a first engaging portion 2211 is formed on the stand engaging element 221, and a second engaging portion 211 is formed on the kickstand 21 and corresponds in shape to the first engaging portion 2211. When in the stand locking state and the stand unlocking state, the second engaging portion 211 engages with the first engaging portion 2211, so as to stop the kickstand 21 from rotating. When the kickstand 21 rotates, the second engaging portion 211 and the first engaging portion 2211 drives the stand engaging element 221 to move away from the kickstand 21. Preferably, the first engaging portion 2211 includes multiple triangular recesses and multiple triangular protrusions, and the second engaging portion 211 also includes multiple triangular recesses and multiple triangular protrusions. However, shapes of the first and second engaging portions 2211, 211 are not limited thereto.

A structure, which stops the stand engaging element 221 from disengaging from the stand operating element 223 is as described as follows. Preferably, the stand operating element 223 includes a stand rotating device 2231 and a stand rotating seat 2232. The stand rotating device 2231 is in signal connection with the electronic controller 10 and is controlled by the electronic controller 10 to rotate the stand rotating seat 2232. Preferably, the stand rotating device 2231 is, but is not limited to, a motor. At least one stand protrusion 2233 and at least one stand recess 2234 are formed on the stand rotating seat 2232 and are arranged annularly.

With reference to FIG. 7, when in the stand locking state, the stand rotating device 2231 rotates the stand rotating seat 2232 to make the at least one stand protrusion 2233 abut against the stand engaging element 221, so as to stop the stand engaging element 221 from disengaging from kickstand 21.

With reference to FIGS. 8 and 9, when in the stand unlocking state, the stand rotating device 2231 rotates the stand rotating seat 2232 to make the at least one stand recess 2234 corresponds in position to the stand engaging element 221, so as to allow the stand engaging element 221 to move toward the at least one stand recess 2234 and to disengage from the kickstand 21.

With reference to FIGS. 6, 8 and 9, the way that the at least one stand protrusion 2233 and the at least one stand recess 2234 cooperate with the stand engaging element 221 is shown. Preferably, an acting protrusion 2212 protrudes from the stand engaging element 221 and corresponds in position to the at least one stand protrusion 2233 and the at least one stand recess 2234. In the first embodiment, the stand rotating seat 2232 is disposed on a diametrical side of the stand engaging element 221, such that the acting protrusion 2212 radially protrudes from the stand engaging element 221. However, it is not limited thereto. The stand rotating seat 2232 also may be disposed on an axial side of the stand engaging element 221, i.e. the stand engaging element 221 is disposed between the stand rotating seat 2232 and the kickstand 21. Thus, the acting protrusion 2212 axially protrudes toward the stand rotating seat 2232 and engages with the stand engaging element 221.

In addition, the stand operating element 223 is not limited to the structure that rotates. The stand operating element 223 also may be a structure that moves linearly. For instance, the stand operating element 223 may be a pressure cylinder or a linear motor. When locking, the stand operating element 223 moves linearly (such as protruding) to abut against the stand engaging element 221, so as to stop the stand engaging element 221 from disengaging from kickstand 21. When unlocking, the stand operating element 223 moves linearly in reverse direction (such retracting), so as to allow the stand engaging element 221 to move and to disengage from the kickstand 21.

Figure 10:
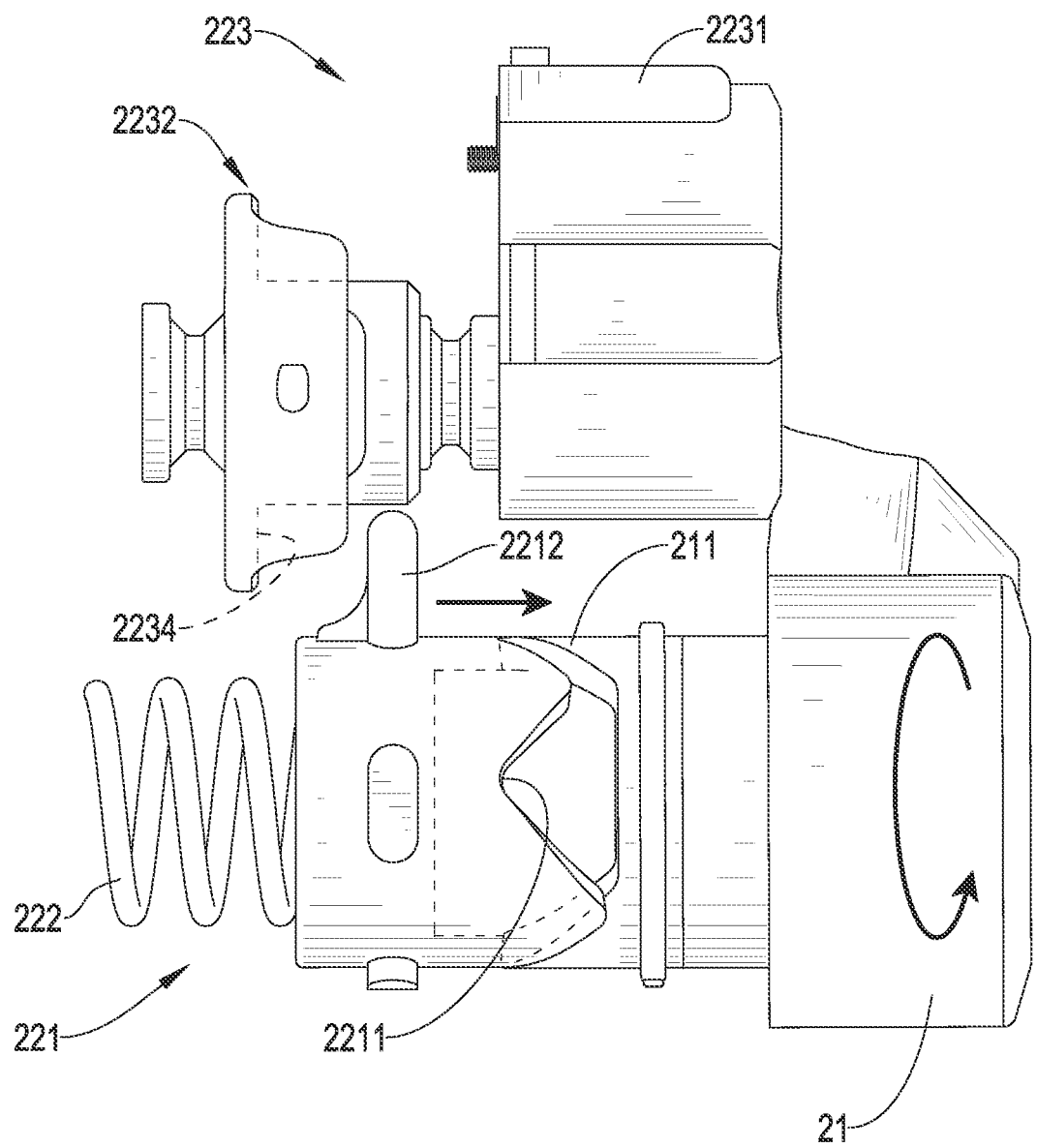

In summary, with reference to FIG. 7, when locking the kickstand 21, the stand rotating device 2231 rotates the stand rotating seat 2232 to a specific angle to make the stand engaging element 221 unable to move away from kickstand 21. Accordingly, the kickstand 21 is unable to be kicked up. Thus, the kickstand 21 keeps flipping down, which causes inconvenience to ride the bicycle or stops the pedal 40 from rotating. With reference to FIGS. 8 to 10, when unlocking the kickstand 21, the stand rotating seat 2232 is rotated to allow the stand engaging element 221 to move and to disengage from the kickstand 21. Thus, the kickstand 21 can be kicked up.

In addition, the stand control device 22 may be designed with automatic locking function. That is, when the kickstand 21 is rotated to flip down, the stand rotating device 2231 would automatically rotate the stand rotating seat 2232 to said specific angle to make the stand engaging element 221 unable to move away from kickstand 21.

Moreover, a sensing device may be additionally mounted to the kickstand lock 20 to identify a rotating angle of the kickstand 21 and to use with the aforementioned application scenarios.

Figure 22:
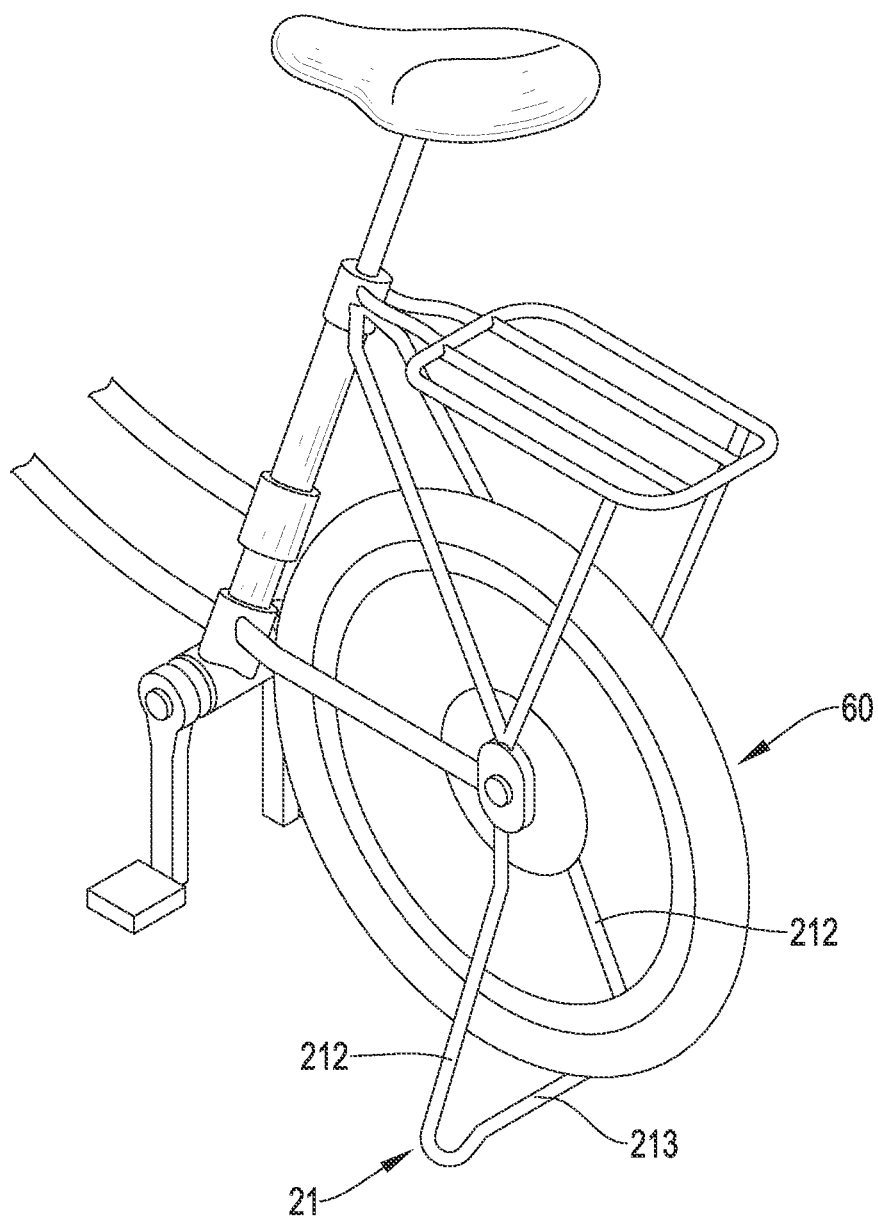
FIG. 22 is an operational perspective view of another embodiment of a kickstand in accordance with the present invention, showing mounted on a bicycle.

In addition, with reference to FIG. 4, the kickstand 21 may be a single elongated rod, such that the bicycle tilts toward the kickstand 21. With reference to FIG. 22, the kickstand 21 may be formed to have two standing rods 212 and a bottom rod 213, such that the rear wheel 60 can be lifted up.

Figure 11:
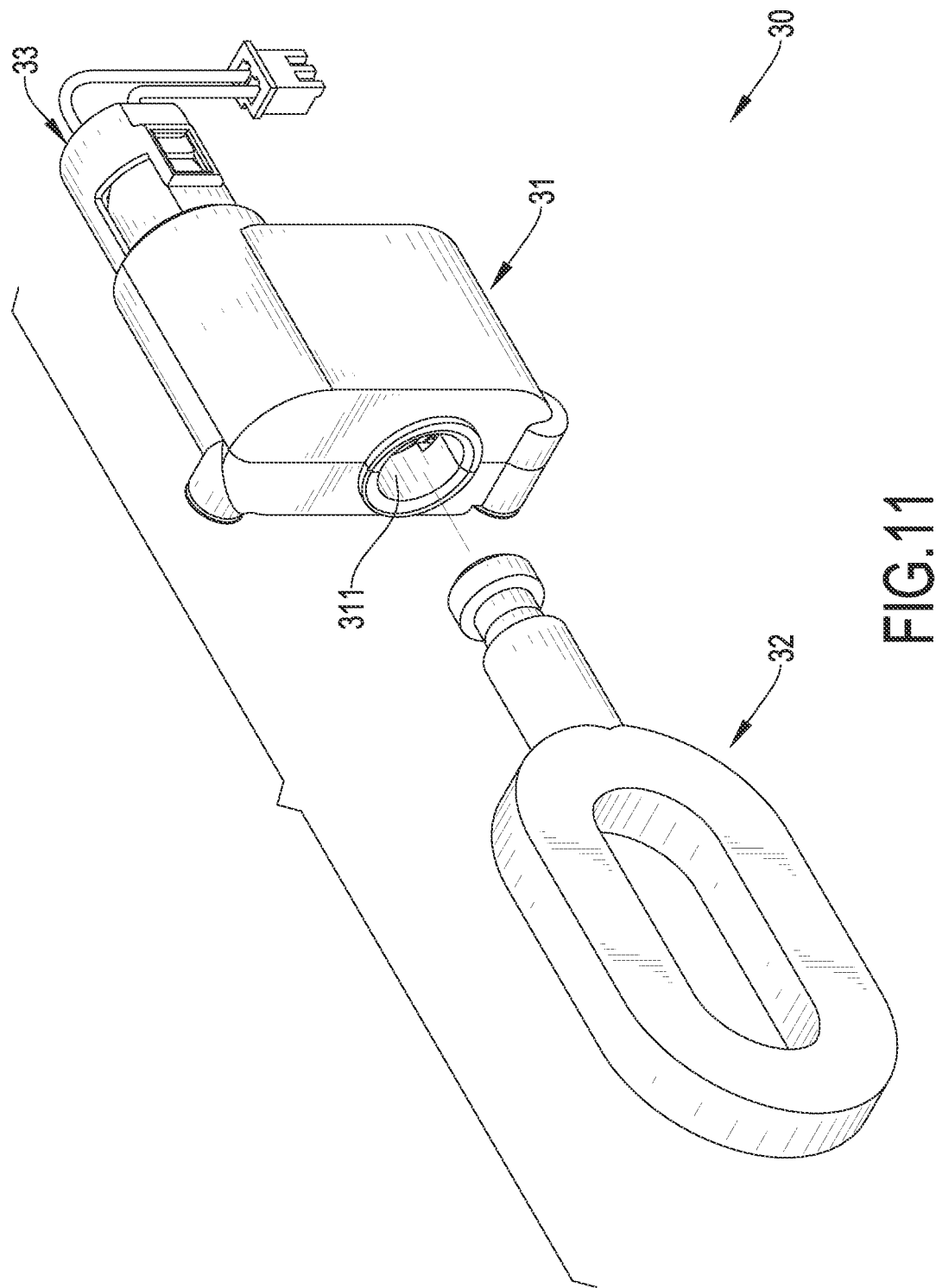
FIG. 11 is an exploded perspective view of a frame lock of the first embodiment of the electronic control lock in FIG. 1.

With reference to FIG. 11, the frame lock 30 includes a housing 31, an inserting element 32, and a frame control device 33.

The housing 31 has an insertion hole 311.

The inserting element 32 is detachably inserted in the insertion hole 311 of the housing 31. As shown in FIG. 1, an end of the inserting element 32 may be connected with other devices, such as the chain 321, that are used to be fastened to other places.

The frame control device 33 is in signal connection with the electronic controller 10 (wired or wireless), is controlled by the electronic controller 10, and has a frame locking state and a frame unlocking state. In the frame locking state, the frame control device 33 stops the inserting element 32 from detaching from the insertion hole 311. In the frame unlocking state, the inserting element 32 is detachable from the insertion hole 311.

Figure 12:
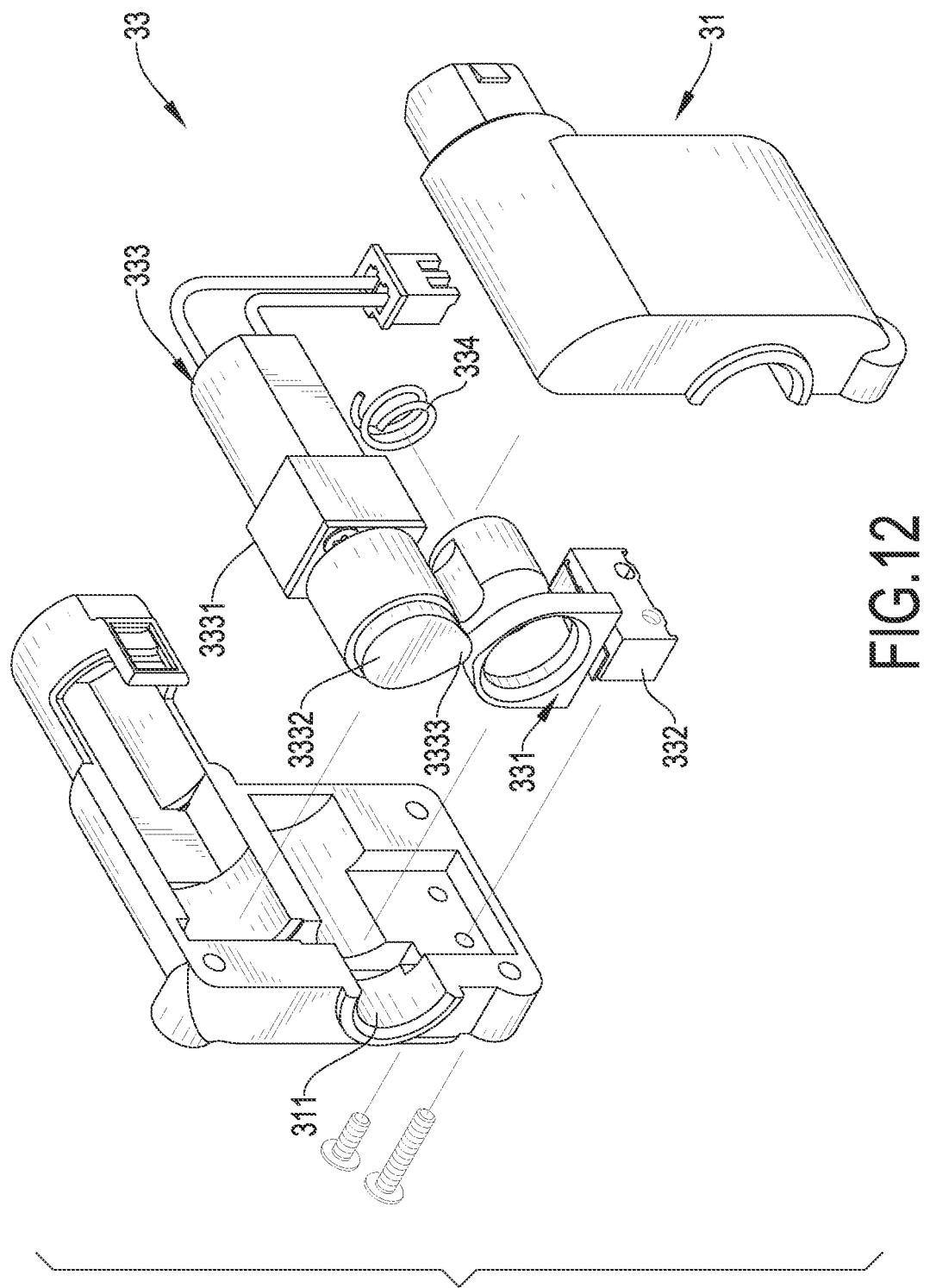
FIGS. 12 and 13 are exploded perspective views of the frame lock of the first embodiment of the electronic control lock in FIG. 11.
Figure 13:
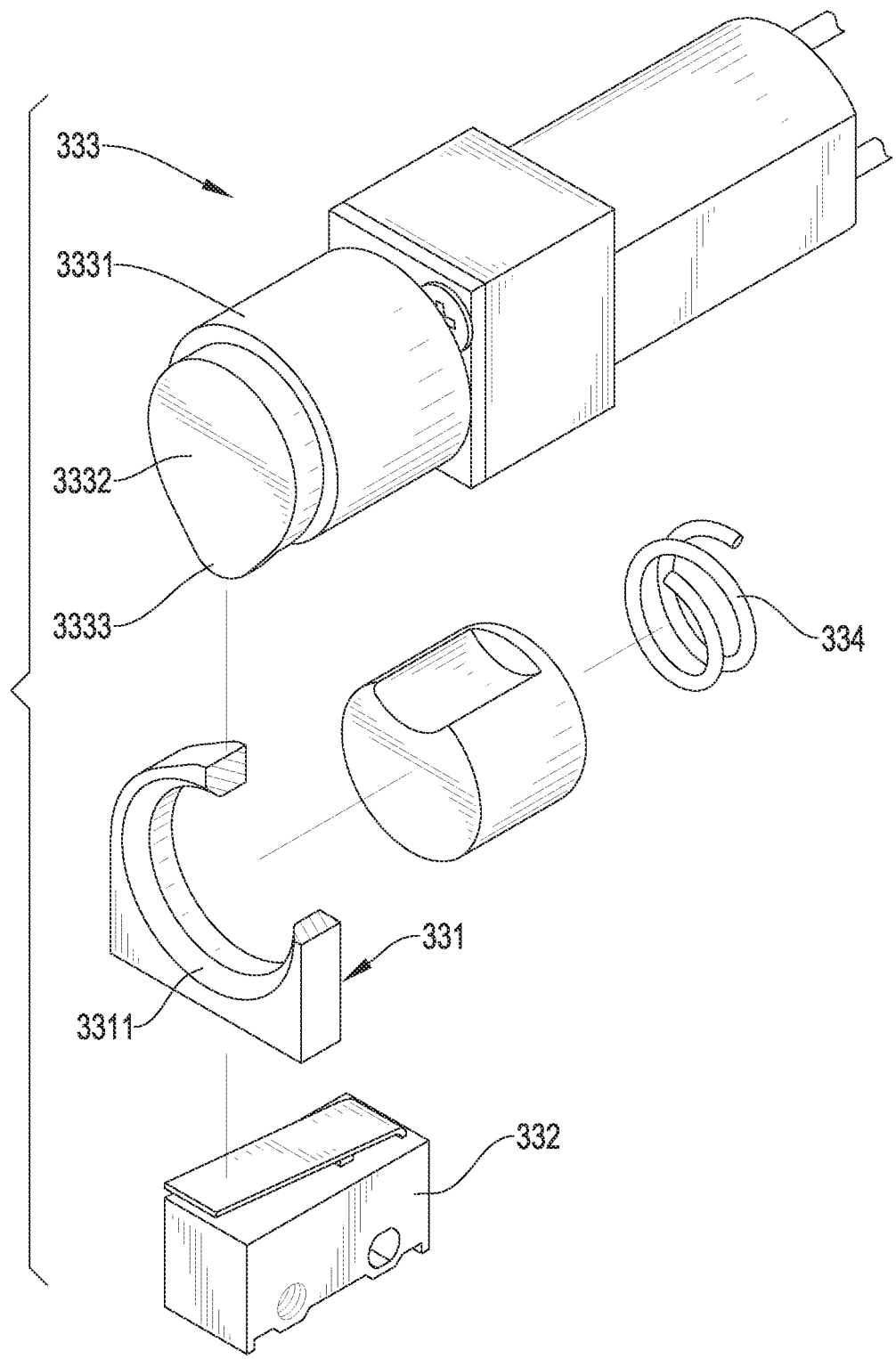
Figure 14:
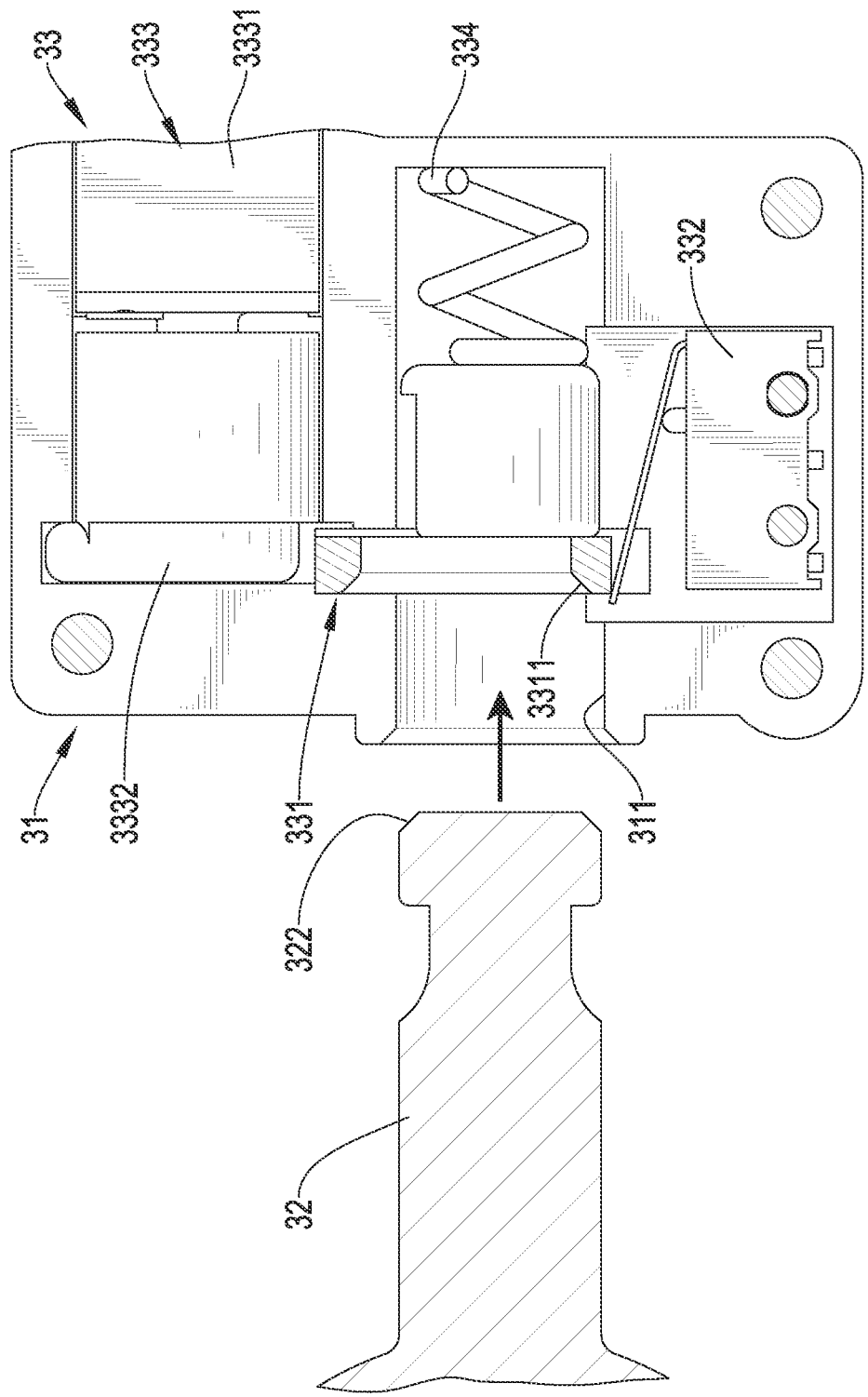
FIGS. 14 to 17 are operational side views in partial section of the frame lock of the first embodiment of the electronic control lock in FIG. 11.
Figure 17:
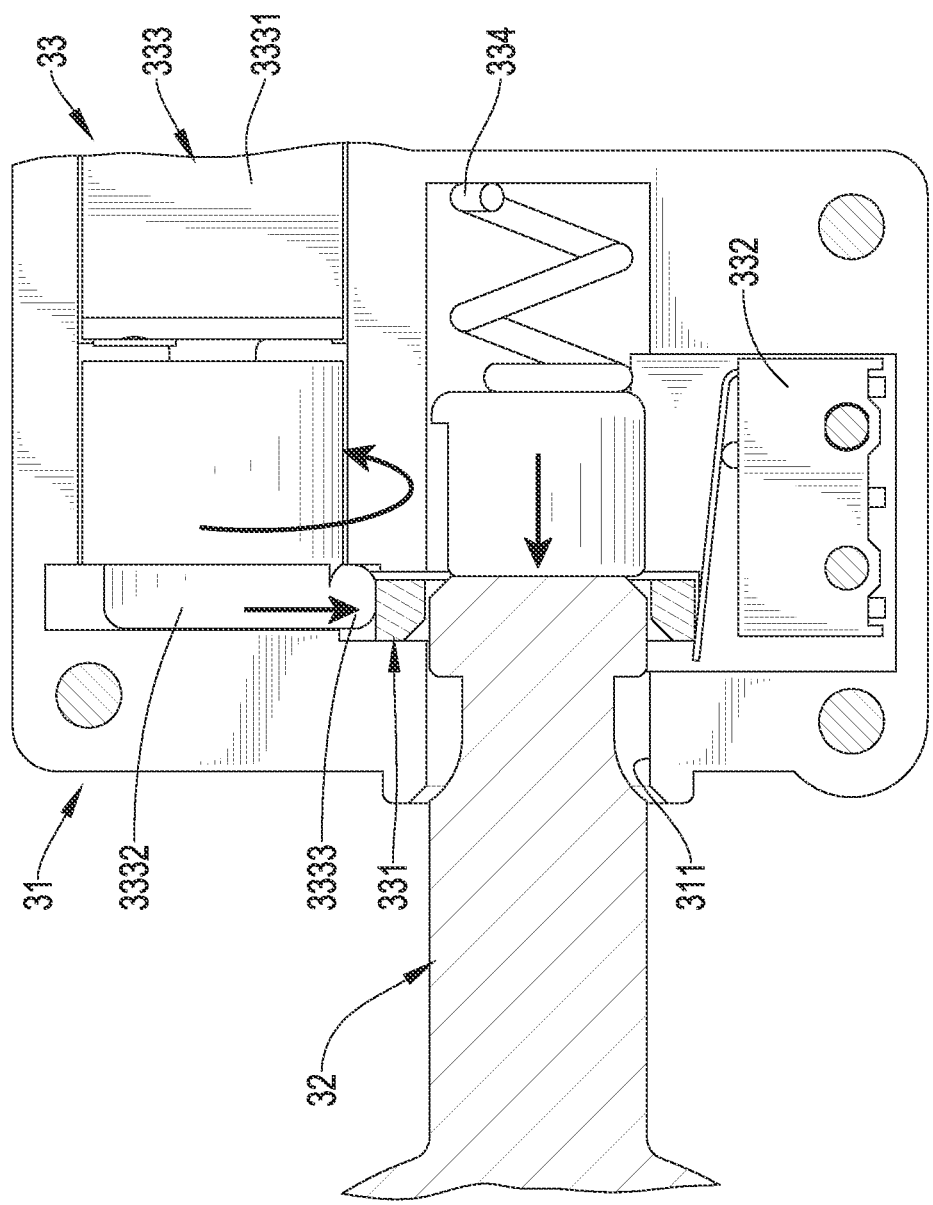

With reference to FIGS. 12 to 14, a structure, which stops the inserting element 32 from detaching from the insertion hole 311, of the frame control device 33 is shown. Preferably, the frame control device 33 includes a frame engaging element 331, a frame resilient element 332, and a frame operating element 333. The frame resilient element 332 tends to force the frame engaging element 331 to engage with the inserting element 32, so as to stop the inserting element 32 from detaching from the insertion hole 311. The frame resilient element 332 is preferably a micro switch that provides sufficient resilient force to push the frame engaging element 331. The frame resilient element 332, which is micro switch, is also able to identify a position of the frame engaging element 331. Besides, the frame engaging element 331 may also be a compression spring. The frame operating element 333 is in signal connection with the electronic controller 10 and is controlled by the electronic controller 10. With reference to FIG. 17, in the frame unlocking state, the frame operating element 333 makes the frame engaging element 331 disengage from the inserting element 32, such that the inserting element 32 is detachable from the insertion hole 311.

Figure 16:
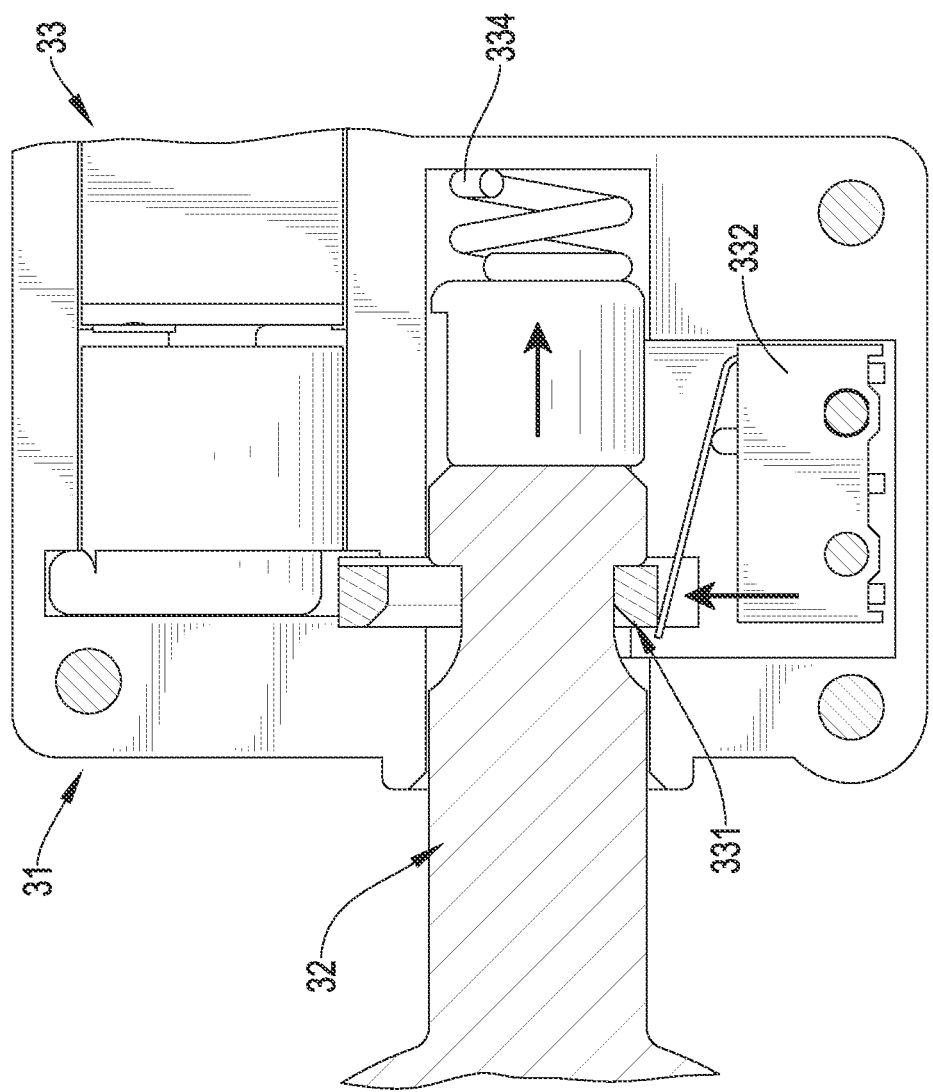

With reference to FIGS. 13, 16 and 17, a structure, which makes the frame engaging element 331 disengage from the inserting element 32, of the frame operating element 333 is shown. Preferably, the frame operating element 333 includes a frame rotating device 3331 and a frame rotating seat 3332. The frame rotating device 3331 is in signal connection with the electronic controller 10 and is controlled by the electronic controller 10 to rotate the frame rotating seat 3332. Preferably, the frame rotating device 3331 is, but is not limited to, a motor. At least one frame protrusion 3333 is formed on the frame rotating seat 3332. Preferably, the frame protrusion 3333 can be a bulging part on a cam.

With reference to FIG. 16, when in the frame locking state, the frame resilient element 332 makes the frame engaging element 331 engage with the inserting element 32.

With reference to FIG. 17, when in the frame unlocking state, the frame rotating device 3331 drives the frame rotating seat 3332 to rotate to make the at least one frame protrusion 3333 abut against the frame engaging element 331, so as to make the frame engaging element 331 disengage from the inserting element 32. Thus the inserting element 32 is detachable from the insertion hole 311.

Figure 15:
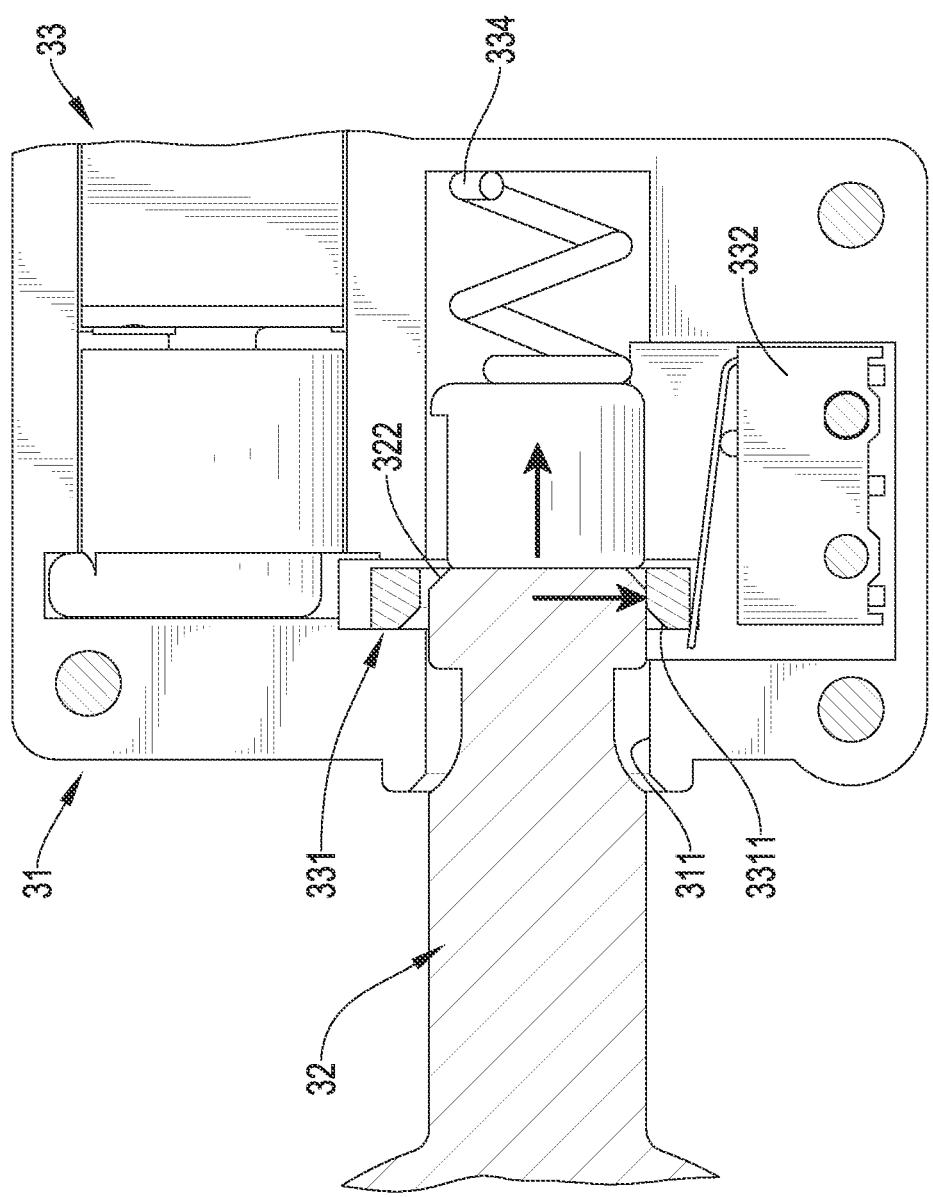

In addition, the aforementioned structure may be designed as a free latching tongue. With reference to FIGS. 14 to 16, for instance, when inserting the inserting element 32 into the insertion hole 311, the inserting element 32 pushes the frame engaging element 331 to move the frame engaging element 331 by compressing the frame resilient element 332. When the inserting element 32 has been inserted into the insertion hole 311 to a certain depth, the frame resilient element 332 pushes the frame engaging element 331 to engage with the inserting element 32, so as to stop the inserting element 32 from detaching the insertion hole 311.

With reference to FIGS. 13 to 16, the frame engaging element 331 is preferably an annular component in one embodiment. Thus, when the inserting element 32 is inserted into the insertion hole 311, the inserting element 32 is mounted through the frame engaging element 331 and abuts against a circumference of the frame engaging element 331 to move the frame engaging element 331 to compress the frame resilient element 332. Preferably, an annular inclined surface 322 is formed on an end of the inserting element 32 and an inclined abutting surface 3311 is formed on the circumference of the frame engaging element 331. The annular inclined surface 322 and the inclined abutting surface 3311 facilitate the inserting element 32 to push the frame engaging element 331 in a radial direction. However, it is also possible to have only the annular inclined surface 322 or only the inclined abutting surface 3311.

Figure 18:
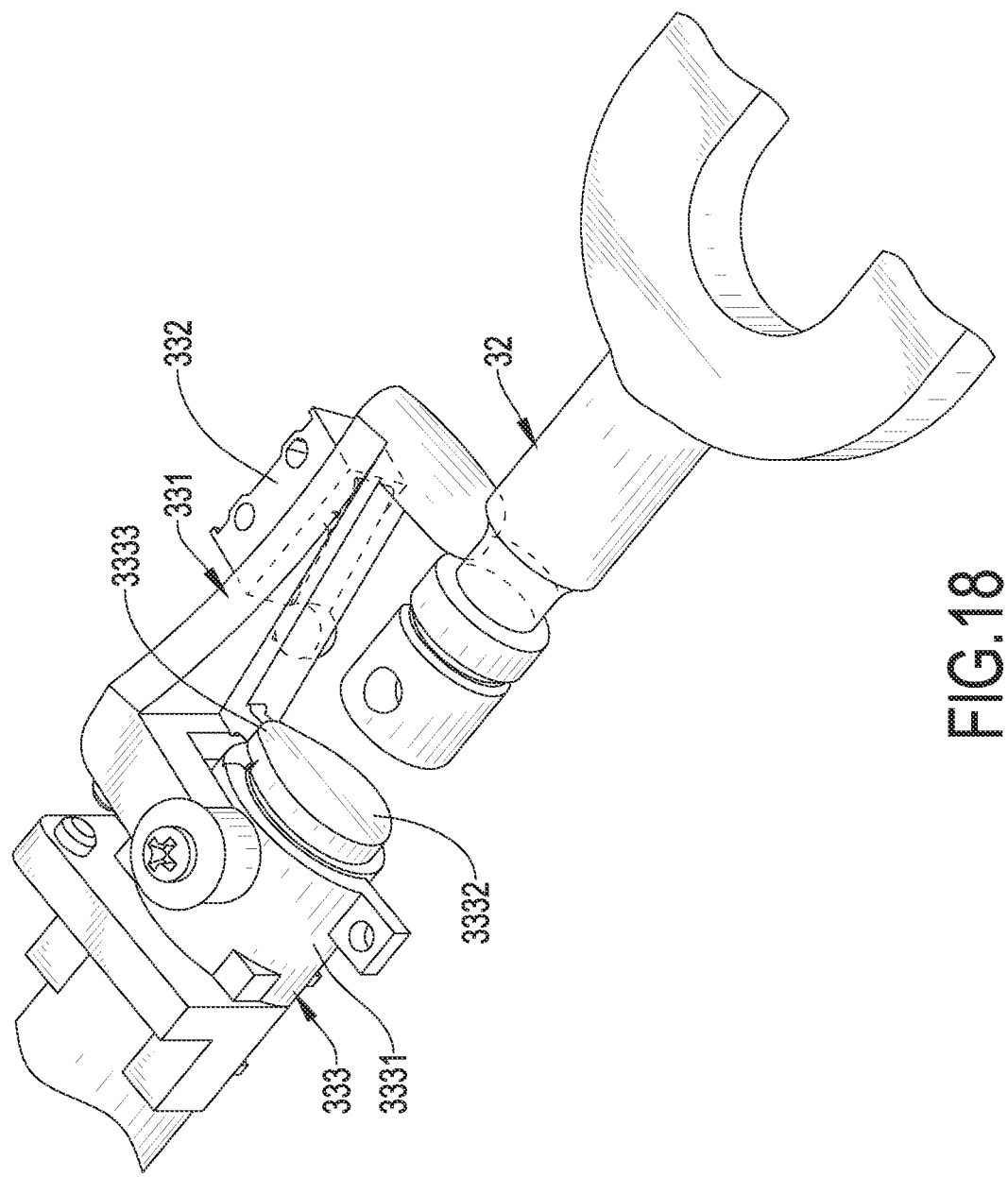
FIGS. 18 and 19 are enlarged perspective views of another embodiment of a frame lock in accordance with the present invention.
Figure 19:
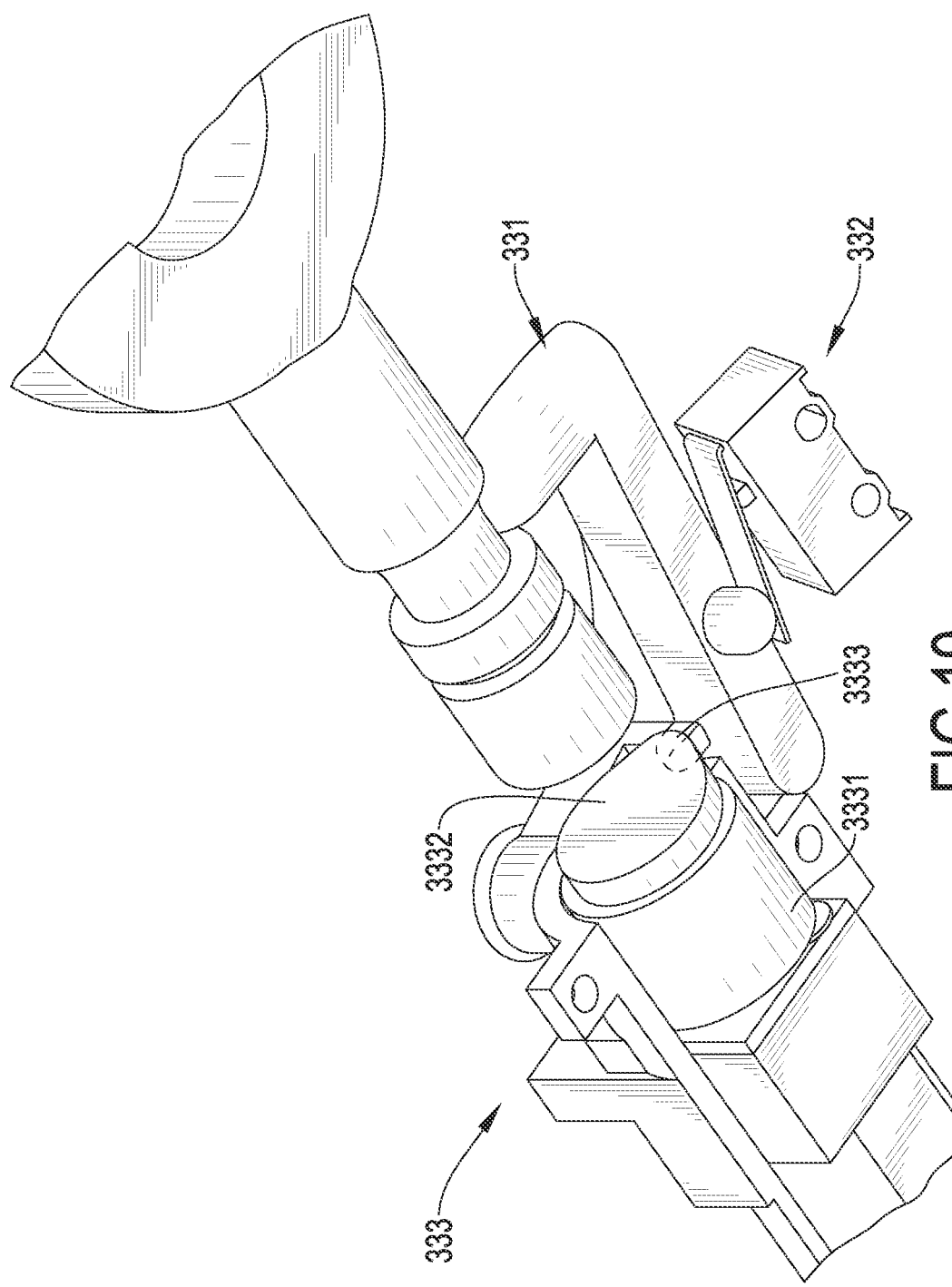

With reference to FIGS. 18 and 19, the frame engaging element 331 is preferably an elongated component in another embodiment and has an inner pivotally connected to elsewhere (such as the frame operating element 333). The frame resilient element 332 pushes the frame engaging element 331 to rotate, so as to make an outer end of the frame engaging element 331 engage with the inserting element 32. When unlocking, the frame rotating seat 3332 is rotated and the at least one frame protrusion 3333 pushes the frame engaging element 331 to rotate, so as to disengage the outer end of the frame engaging element 331 from the inserting element 32.

Lastly, with reference to FIGS. 13, 16 and 17, in one preferred embodiment, when unlocking, the frame control device 33 pushes the inserting element 32 toward and out of the insertion hole 311, but it is not limited to push the whole inserting element 32 out of the insertion hole 311. Preferably, the frame control device 33 includes an ejecting resilient element 334. When the inserting element 32 is inserted into the insertion hole 311 and the frame engaging element 331 engages with the inserting element 32, the ejecting resilient element 334 is compressed. Once unlocked, the frame engaging element 331 disengages from the inserting element 32 and the ejecting resilient element 334 immediately pushes the inserting element 32 outward.

In addition, the frame operating element 333 is not limited to the structure that rotates. The frame operating element 333 also may be a structure that moves linearly. For instance, the frame operating element 333 may be a pressure cylinder or a linear motor. When unlocking, the frame operating element 333 moves linearly (such as protruding) to abut against the frame engaging element 331, so as to disengage the frame engaging element 331 from the inserting element 32. When locking, the frame operating element 333 moves linearly in reverse direction (such retracting), so as to allow the frame resilient element 332 to push the frame engaging element 331 to engage with the inserting element 32.

In summary, when locking, the frame rotating device 3331 rotates the frame rotating seat 3332 to a specific angular range and be free from abutting the frame engaging element 331. Thus, the frame resilient element 332 pushes the frame engaging element 331 to engage with the inserting element 32. When unlocking, the frame rotating seat 3332 rotates and abuts against the frame engaging element 331, such that the frame engaging element 331 disengage from the inserting element 32 and the ejecting resilient element 334 pushes the inserting element 32 to move outward.

In addition, a sensing device may be additionally mounted to the frame lock 30 to identify if the inserting element 32 is inserted into the insertion hole 311 and to use with the aforementioned application scenarios With the kickstand lock 20 and the frame lock 30 as described above, in the present invention, the stand control device 22 controls rotation of the kickstand 21, the frame control device 33 controls whether the inserting element 32 can be pulled out, and the electronic controller 10 controls the stand control device 22 and the frame control device 33. A user may control the electronic controller 10 through an application, which is in connection with the electronic controller 10, in a mobile phone. However, the electronic controller 10 may also be controlled through other ways.

Specifically, when unlocking, the electronic controller 10 controls the stand control device 22 and the frame control device 33 to allow the kickstand 21 to be kicked up and the inserting element 32 to be pulled out or be ejected automatically.

When locking, the stand control device 22 locks the kickstand 21 automatically as the kickstand 21 is kicked to flip down, and the frame control device 33 locks the inserting element 32 automatically as the inserting element 32 is inserted into the insertion hole 311.

Therefore, the kickstand lock 20 and the frame lock 30 can be locked or unlocked without traditional keys.

Furthermore, the electronic control lock of the present invention may further comprises an alarm device. If the kickstand 21 is forced to rotate when the kickstand 21 is locked, if the inserting element 32 is pulled outward when the frame lock 30 is locked, or when the bicycle is shaken to a certain extent, the alarm device would sound and/or the electronic controller 10 would inform the user (such as through the application of the mobile phone) immediately.

Figure 20:
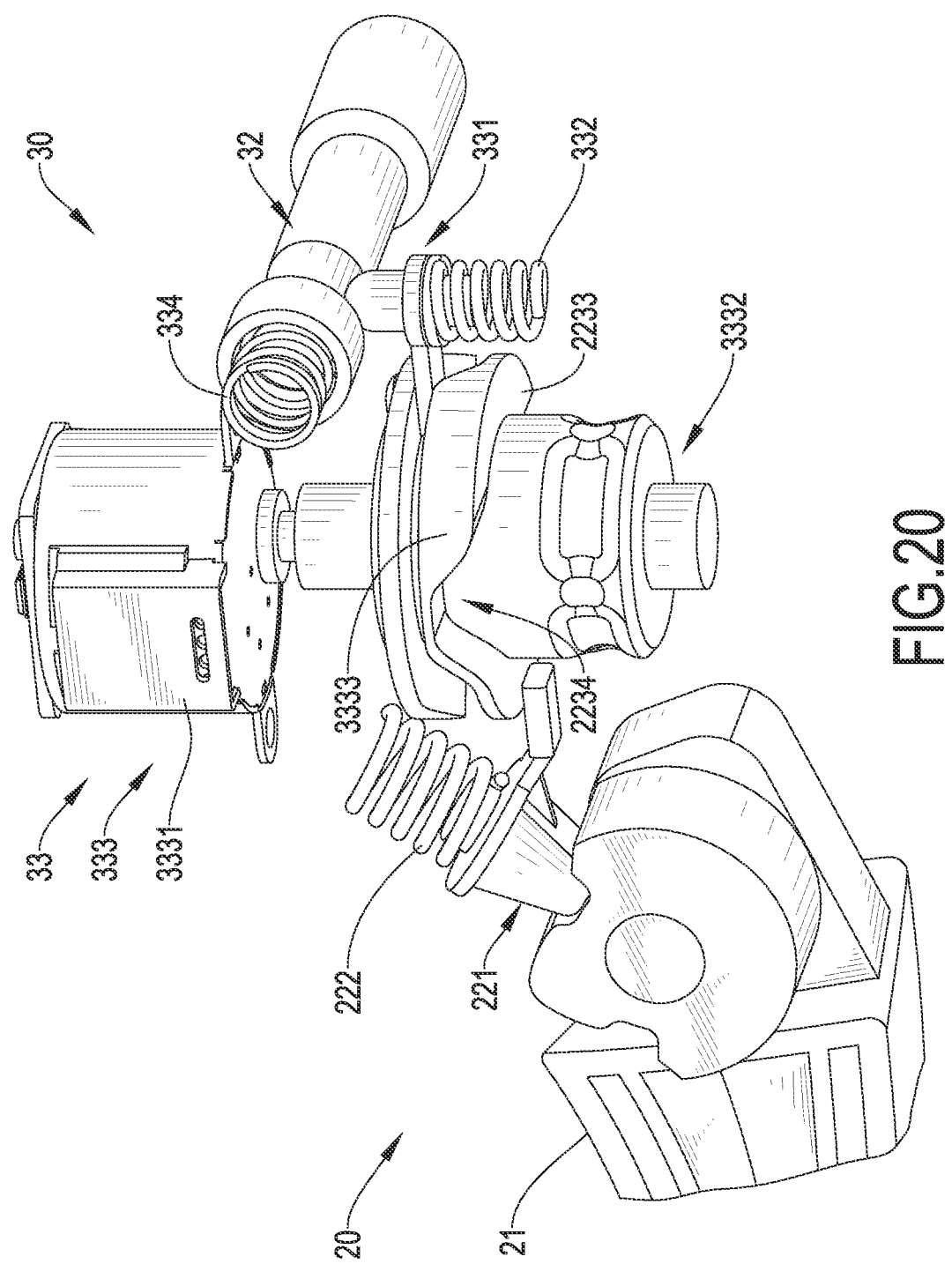
FIG. 20 is an enlarged perspective view of a second embodiment of an electronic control lock in accordance with the present invention.
Figure 21:
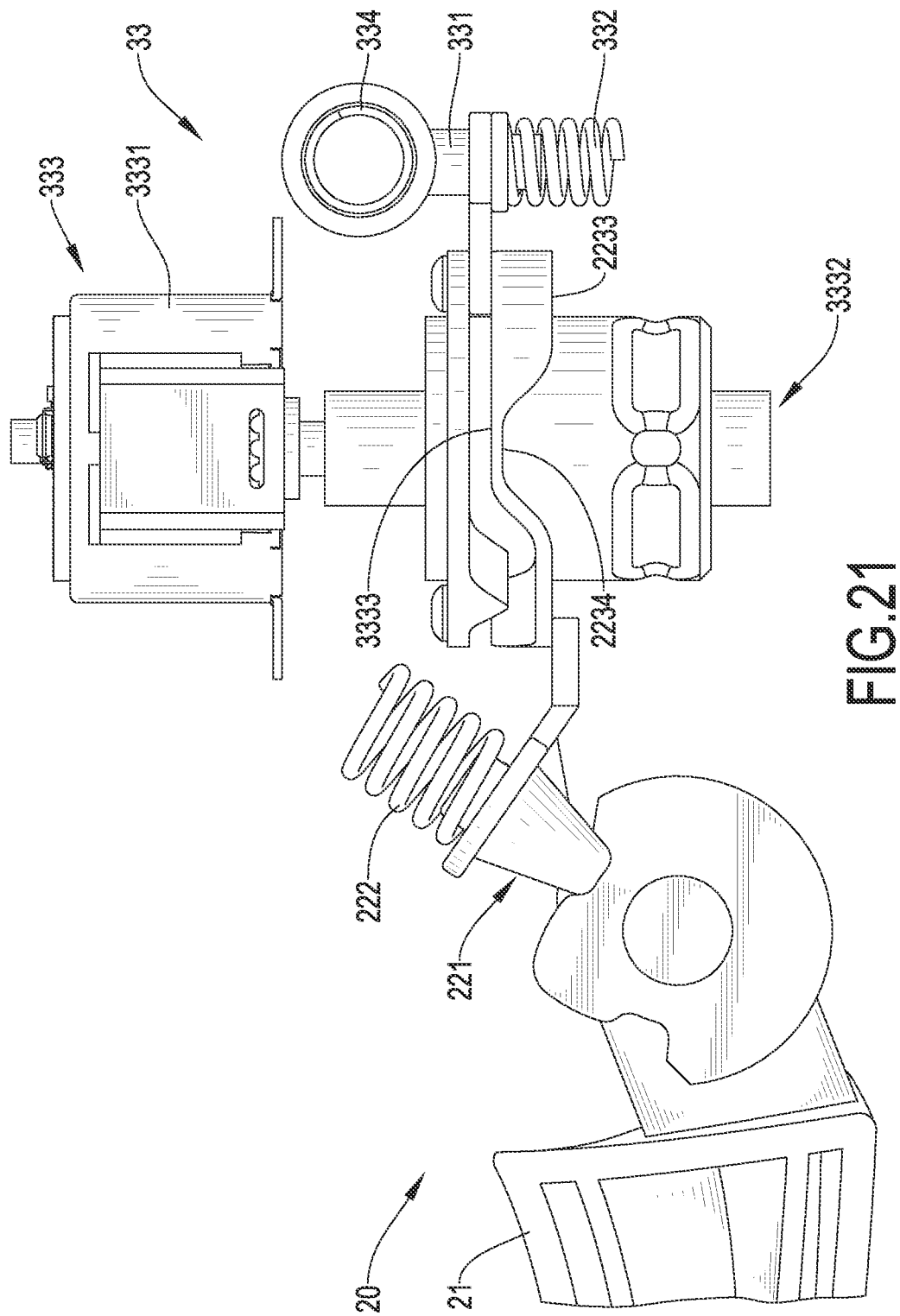
FIG. 21 is an enlarged side view of the second embodiment of an electronic control lock in FIG. 20.

With reference to FIGS. 20 and 21, a second embodiment of the electronic control lock is shown and is similar to the first embodiment. The differences therebetween are as follows. The kickstand lock 20 and the frame lock 30 are combined. The kickstand 21 and the inserting element 32 share one control device, which may be regarded as the frame control device 33 or the stand control device. The stand engaging element 221 and the frame engaging element 331 share one operating element, which may be regarded as the frame operating element 333 or the stand operating element. That is, the stand engaging element 221 and the frame engaging element 331 share one rotating device, which may be regarded as the frame rotating device 3331 or the stand rotating device, and one rotating seat, which may be regarded as the frame rotating seat 3332 or the stand rotating seat. The at least one stand protrusion 2233, the at least one stand recess 2234, and the at least one frame protrusion 3333 are disposed on the rotating device at the same time. Preferably, the at least one frame protrusion 3333 is formed as a closed track, and the at least one stand protrusion 2233 and the at least one stand recess 2234 are formed as an open structure (facing downward). However, they are not limited thereto.

In the second embodiment, rotation of the single rotating seat controls whether the kickstand 21 is able to be kicked up and whether the inserting element 32 is able to be detached. Therefore, the whole structure can be further simplified.

An electronically controlled locking/unlocking method of the bicycle has four embodiments. The first embodiment has only the kickstand 21, the second embodiment has only the frame lock 30, and each of the third and fourth embodiments has both the kickstand 21 and the frame lock 30.

The first embodiment of the electronically controlled locking/unlocking method includes steps as follows.

With reference to FIGS. 4 and 7, when the kickstand 21 has been flipped down, the stand control device 22 makes the kickstand 21 unable to be kicked up. Preferably, when the kickstand 21 has been flipped down, the stand control device 22 automatically makes the kickstand 21 unable to be kicked up. However, it is not limited thereto. The stand control device 22 can be controlled by human to make the kickstand 21 unable to be kicked up.

With reference to FIGS. 8 to 10, when unlocking the kickstand 21, the stand control device 22 is controlled by sending signals through the electronic controller 10, such that the kickstand 21 is able to be kicked up.

The second embodiment of the electronically controlled locking/unlocking method includes steps as follows.

With reference to FIGS. 11 and 16, when the inserting element 32 has been inserted into the insertion hole 311, the frame control device 33 makes the inserting element 32 unable to detach from the insertion hole 311. Preferably, when the inserting element 32 has been inserted into the insertion hole 311, the frame control device 33 automatically makes the inserting element 32 unable to detach from the insertion hole 311. However, it is not limited thereto.

With reference to FIG. 17, when unlocking the inserting element 32, the frame control device 33 is controlled by sending signals through the electronic controller 10, such that the inserting element 32 is detachable from the insertion hole 311.

The third embodiment of the electronically controlled locking/unlocking method includes steps as follows.

When the kickstand 21 has been flipped down, the stand control device 22 makes the kickstand 21 unable to be kicked up. When the inserting element 32 has been inserted into the insertion hole 311, the frame control device 33 makes to the inserting element 32 unable to detach from the insertion hole 311. Flipping down the kickstand 21 and inserting the inserting element 32 are performed in no particular order.

When unlocking, the stand control device 22 is controlled by sending signals through the electronic controller 10 such that the kickstand 21 is able to be kicked up, and the frame control device 33 is controlled by sending signals through the electronic controller 10 such that the inserting element 32 is detachable from the insertion hole 311. Unlocking the kickstand 21 and unlicking the inserting element 32 are performed in no particular order and may be performed simultaneously.

The third embodiment of the electronically controlled locking/unlocking method is similar to the third embodiment. The differences therebetween are that the kickstand 21 and the inserting element 32 share one control device (may be regarded as the frame control device 33 or the stand control device). When the kickstand 21 has been flipped down, the control device makes the kickstand 21 unable to be kicked up. When the inserting element 32 has been inserted into the insertion hole 311, said same control device makes to the inserting element 32 unable to detach from the insertion hole 311.

When unlocking, the stand control device 22 is controlled to allow the kickstand 21 being able to be kicked up and the frame control device 33 is controlled to allow the inserting element 32 being detachable from the insertion hole 311 by sending signals through the electronic controller 10.

The above-mentioned four embodiments of the electronically controlled locking/unlocking methods may be performed with the above-mentioned electronic control lock of the bicycle. Moreover, how the electronic control lock is used as described above can be incorporated into the electronically controlled locking/unlocking method. For instance, the inserting element 32 would be ejected and the alarm device would sound when the inserting element 32 is unlocked. More detailed descriptions are not repeated again.

In addition, when controlling the electronic controller 10 in the above-mentioned four embodiments of the electronically controlled locking/unlocking methods, after commanding for each action, it can automatically check battery before starting the action. Moreover, before or after controlling the stand rotating device 2231 or the frame rotating device 3331 to rotate, it can automatically check whether the stand rotating device 2231 and the frame rotating device 3331 are disposed at or rotated to correct angles. In addition, when the kickstand 21 is kicked up or flipper down, it can also check whether the kickstand 21 is rotated to a correct angle. For instance, when unlocking and kicking up the kickstand 21, if the kickstand 21 is not fully kicked up, the kickstand 21 would be automatically locked again. Furthermore, when the inserting element 32 has been inserted into or pulled out from the insertion hole 311, it can automatically check whether the inserting element 32 is inserted to a correct position or is fully pulled out.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electronic control lock in combination with a kickstand of a bicycle, the combination comprising:
   an electronic controller; and
   a kickstand lock including
      the kickstand being rotatable and having a flip-down state and a kicked-up state; and
      a stand control device being in signal connection with the electronic controller, controlled by the electronic controller, and having a stand locking state and a stand unlocking state, wherein the stand control device includes
         a stand engaging element;
         a stand resilient element tending to force the stand engaging element to engage with the kickstand, so as to stop the kickstand from rotating; and
         a stand operating element being in signal connection with the electronic controller, controlled by the electronic controller, and including a stand rotating device and a stand rotating seat, wherein
            the stand rotating device is in signal connection with the electronic controller, is controlled by the electronic controller, and selectively rotates the stand rotating seat; and
            at least one stand protrusion and at least one stand recess are formed on the stand rotating seat and are arranged annularly;
      wherein in the stand locking state, the stand rotating device rotates the stand rotating seat to locate the at least one stand protrusion, such that when the kickstand is rotated out of the flip-down state, the stand engaging element directly abuts against the at least one stand protrusion, thereby stopping the kickstand from being further rotated to the kicked-up state; and
      wherein in the stand unlocking state, the stand rotating device rotates the stand rotating seat to make the at least one stand recess correspond in position to the stand engaging element, so as to allow the stand engaging element to move toward the at least one stand recess and to disengage from the kickstand, and thereby allowing the kickstand to rotate from the flip-down state to the kicked-up state.

* * * * *